United States Patent
Takumi et al.

(10) Patent No.: US 10,891,389 B2
(45) Date of Patent: Jan. 12, 2021

(54) INFORMATION PROCESSING APPARATUS, INFORMATION PROCESSING METHOD, AND COMPUTER PROGRAM PRODUCT

(71) Applicant: Kabushiki Kaisha Toshiba, Minato-ku (JP)

(72) Inventors: Shinya Takumi, Kawasaki (JP); Yoshikazu Hanatani, Komae (JP); Hiroyoshi Haruki, Kawasaki (JP); Masanobu Koike, Tama (JP); Naoki Ogura, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 225 days.

(21) Appl. No.: 16/115,761

(22) Filed: Aug. 29, 2018

(65) Prior Publication Data

US 2019/0286833 A1    Sep. 19, 2019

(30) Foreign Application Priority Data

Mar. 13, 2018   (JP) .................. 2018-045919

(51) Int. Cl.
*G06F 21/62* (2013.01)
*H04L 9/32* (2006.01)
(Continued)

(52) U.S. Cl.
CPC ...... *G06F 21/6218* (2013.01); *G06F 16/1774* (2019.01); *G06F 21/51* (2013.01); *H04L 9/3236* (2013.01)

(58) Field of Classification Search
CPC .. G06F 21/6218; G06F 21/51; G06F 16/1774; H04L 9/3236
(Continued)

(56) References Cited

U.S. PATENT DOCUMENTS 5,289,540 A * 2/1994 Jones ................. G06F 21/6218
340/5.74
5,404,520 A * 4/1995 Sonobe ............. G06F 16/24532
718/101
(Continued)

FOREIGN PATENT DOCUMENTS

JP   2009-181461 A   8/2009
JP   2019-40256 A   3/2019
(Continued)

OTHER PUBLICATIONS

Sun, Yifeng, et al. "Fast live cloning of virtual machine based on xen." 2009 11th IEEE International Conference on High Performance Computing and Communications. IEEE, 2009. (Year: 2009).*

(Continued)

*Primary Examiner* — Syed A Zaidi
(74) *Attorney, Agent, or Firm* — Oblon, McClelland, Maier & Neustadt, L.L.P.

(57) ABSTRACT

According to an embodiment, an information processing apparatus includes processing circuitry configured to function as a start process control unit, a file read detection unit, a determination unit, and a file reading unit. The start process control unit is configured to register at least a specific process of started processes in an identifiable manner into a first list. The file read detection unit is configured to detect a request to read a file by the specific process registered in the first list. The determination unit is configured to determine whether to allow reading of the requested file based on a first condition. The file reading unit is configured to control reading of the file in accordance with a determination result of the determination unit.

12 Claims, 19 Drawing Sheets

(51) Int. Cl.
*G06F 21/51* (2013.01)
*G06F 16/176* (2019.01)

(58) Field of Classification Search
USPC .......................................................... 726/1
See application file for complete search history.

(56) References Cited

U.S. PATENT DOCUMENTS

| | | | |
|---|---|---|---|
| 6,523,132 B1* | 2/2003 | Harari | G06F 3/0601 |
| | | | 711/E12.008 |
| 7,467,166 B2* | 12/2008 | White | G06F 12/084 |
| 8,151,109 B2 | 4/2012 | Fanton et al. | |
| 8,387,047 B1* | 2/2013 | Mazin | G06F 9/445 |
| | | | 718/1 |
| 2002/0019936 A1* | 2/2002 | Hitz | G06F 21/6236 |
| | | | 713/165 |
| 2005/0157564 A1* | 7/2005 | Hosono | G11C 11/5642 |
| | | | 365/189.15 |
| 2006/0070112 A1* | 3/2006 | LaMacchia | G06F 21/52 |
| | | | 726/1 |
| 2009/0300017 A1* | 12/2009 | Tokusho | G06F 16/2343 |
| 2011/0179246 A1* | 7/2011 | Kim | G06F 12/0292 |
| | | | 711/170 |
| 2013/0055369 A1* | 2/2013 | Kumar | H04L 9/3247 |
| | | | 726/7 |
| 2015/0242151 A1* | 8/2015 | Makuni | G06F 3/0679 |
| | | | 711/103 |
| 2016/0132675 A1 | 5/2016 | Fanton et al. | |
| 2018/0293404 A1* | 10/2018 | Tsai | G06F 21/6245 |
| 2019/0065735 A1 | 2/2019 | Ogura et al. | |
| 2019/0073471 A1 | 3/2019 | Haruki et al. | |
| 2019/0080059 A1 | 3/2019 | Takumi et al. | |
| 2019/0080080 A1 | 3/2019 | Ogura et al. | |

FOREIGN PATENT DOCUMENTS

| | | |
|---|---|---|
| JP | 2019-46266 A | 3/2019 |
| JP | 2019-49877 A | 3/2019 |
| JP | 2019-50507 A | 3/2019 |

OTHER PUBLICATIONS

Thomas, Roshan K., and Ravi S. Sandhu. "Task-based authorization controls (TBAC): A family of models for active and enterprise-oriented authorization management." Database Security XI. Springer, Boston, MA, 1998. 166-181. (Year: 1998).*
NPL Search Results (Year: 2020).*
NPL Search Terms (Year: 2020).*

* cited by examiner

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2018-045919, filed on Mar. 13, 2018; the entire contents of which are incorporated herein by reference.

FIELD

Embodiments described herein relate generally to an information processing apparatus, an information processing method, and a computer program product.

BACKGROUND

One of methods for increasing security of information processing is whitelisting execution control that allows only predetermined applications to run. Applications to be controlled include executable-format applications that can be directly executed by processors, such as central processing units (CPUs), and script-format applications to be interpreted and executed by interpreters. To implement safer whitelisting execution control, it is desirable to perform execution control on not only an application body but also modules that are read during running of the application.

A known method of whitelisting execution control for script-format applications is to perform whitelisting execution control on a script-format application body run by an interpreter. However, there is no known method for performing whitelisting execution control on script-format modules which are read while an interpreter is running a script-format application.

DETAILED DESCRIPTION

According to an embodiment, an information processing apparatus includes processing circuitry configured to function as a start process control unit, a file read detection unit, a determination unit, and a file reading unit. The start process control unit is configured to register at least a specific process of started processes in an identifiable manner into a first list. The file read detection unit is configured to detect a request to read a file by the specific process registered in the first list. The determination unit is configured to determine whether to allow reading of the requested file based on a first condition. The file reading unit is configured to control reading of the file in accordance with a determination result of the determination unit.

An information processing apparatus, an information processing method, and a computer program product according to embodiments will be described in detail below with reference to the figures. In the following description, the components having similar functions are denoted by the same reference signs and an overlapping description is omitted where appropriate.

Overview

Figure 1:
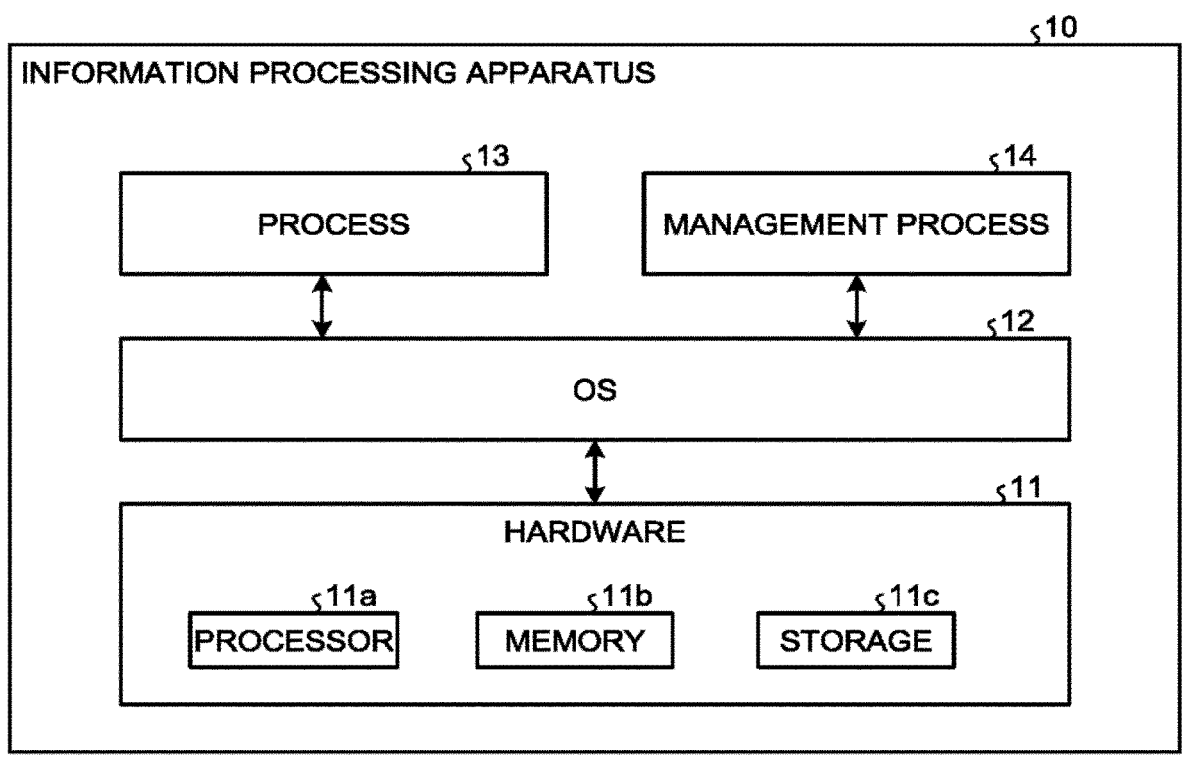
FIG. 1 is a block diagram illustrating an overall configuration of an information processing apparatus.

FIG. 1 is a block diagram illustrating an overall configuration of an information processing apparatus 10. As illustrated in FIG. 1, the information processing apparatus 10 includes hardware 11, such as a processor (processor circuit) 11a such as a central processing unit (CPU), a memory 11b, and a storage 11c, an operating system (OS) 12 configured to operate the functions of the hardware 11, and a process 13 and a management process 14 operative using the functions of the OS 12. The OS 12 manages the process 13 and the management process 14 by appropriately allocating the processor 11a, the memory 11b, and the like of the hardware 11 such that one or more processes 13 and management process 14 can operate concurrently in parallel. A virtual machine monitor (VMM)/hypervisor, such as Xen, KVM, and Hyper-V, may operate between the OS 12 and the hardware 11, and the hardware 11 managed by the OS 12 may be virtual hardware.

The process 13 refers to a computer program in operation with the processor 11a and/or the memory 11b allocated by the OS 12. As used herein, the computer program includes an executable-format application and an interpreter. A script-format application is run by a process of an interpreter. These computer programs and modules which are part of computer programs are stored as files. The management process 14 is a specialized process for performing whitelisting execution control in cooperation with the OS 12. The function corresponding to the management process 14 may be implemented within the OS 12.

The management process 14 implements whitelisting execution control for an executable-format application and/or a script-format application by controlling starting of a process 13 or reading of a module as indicated by the OS 12 based on a predetermined whitelist. Examples of the interpreter for executing a script-format application include Java (registered trademark), Python, Ruby, Perl, JavaScript (registered trademark), PHP, PerlScript, Lua, and VBScript. However, the interpreter is not limited to these examples.

The script-format application is designated in an argument during process starting by the interpreter and may read a script-format module during running. Since a script-format module is run by reading a file, it is necessary to control reading of a file. In the present embodiment, file reading control is performed exclusively for script-format modules in order to avoid overhead and/or excessive control otherwise caused by reading a file. In order to implement this, the types of applications classified into script format and executable format are managed on the management process 14, and file read control is targeted exclusively for reading of a file requested during running of a script-format application. Files requested to be read during running of a script-format application include, in addition to script-format modules, files (files not to be executed) treated as mere data that are not program codes. The types of files classified into files of script-format modules and files to be treated as data are thus identified on the management process 14, and the file read control is targeted exclusively for script-format modules.

First Embodiment

Figure 2:
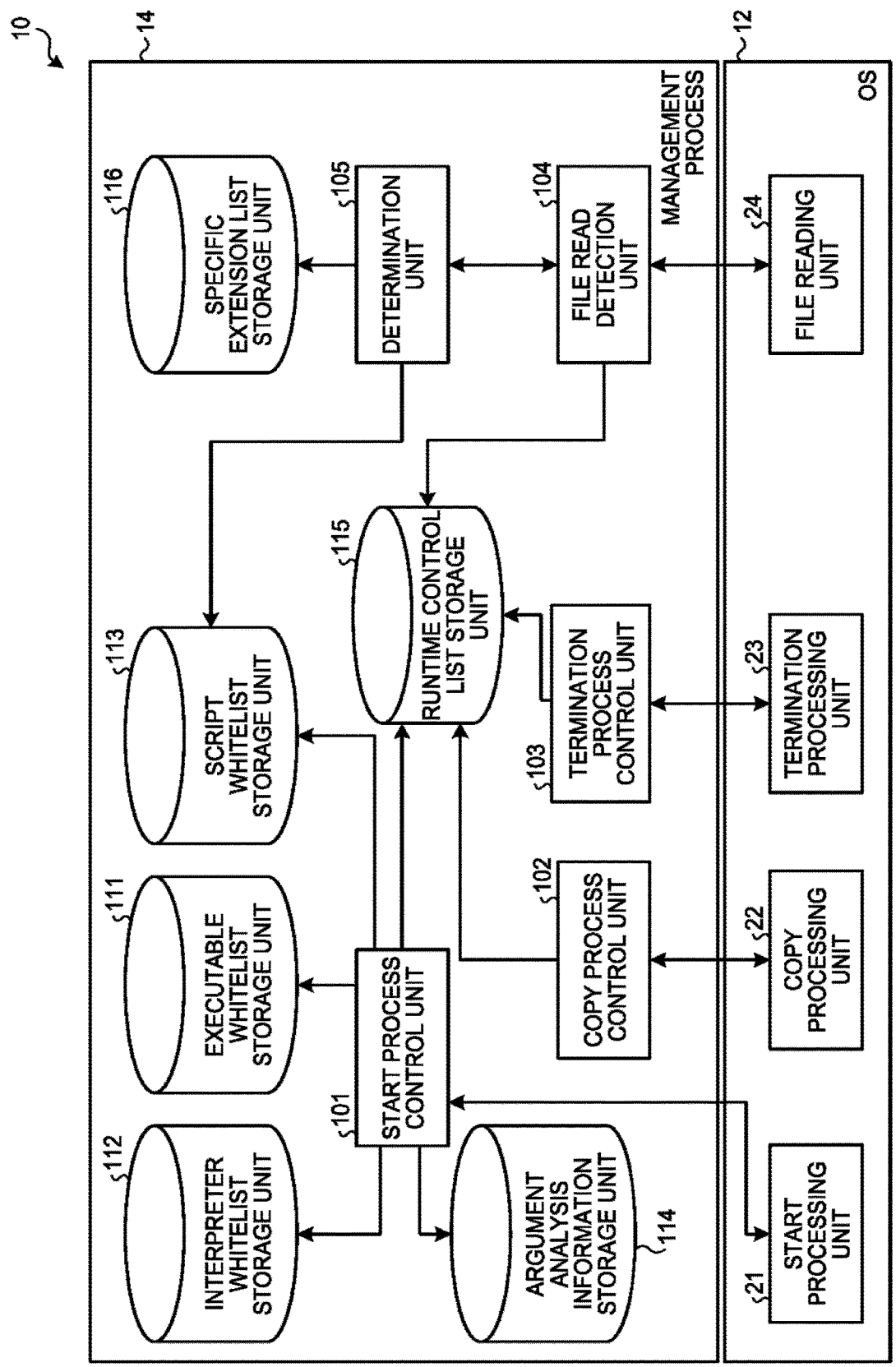
FIG. 2 is a block diagram illustrating a functional configuration example of the information processing apparatus according to a first embodiment.

FIG. 2 is a block diagram illustrating a functional configuration example of the information processing apparatus 10 according to a first embodiment and mainly illustrates the functions of the management process 14 operating on the OS 12. The OS 12 includes, as the functions relating to the management of the process 13, a start processing unit 21 configured to perform the processing of starting a process 13, a copy processing unit 22 configured to perform the processing of copying a process 13, a termination processing unit 23 configured to perform the processing of terminating a process 13, and a file reading unit 24 configured to control reading of a file by a process 13.

As illustrated in FIG. 2, the management process 14 includes a start process control unit 101, a copy process control unit 102, a termination process control unit 103, a file read detection unit 104, and a determination unit 105. The management process 14 includes an executable whitelist storage unit 111 configured to store an executable whitelist, an interpreter whitelist storage unit 112 configured to store an interpreter whitelist, a script whitelist storage unit 113 configured to store a script whitelist, an argument analysis information storage unit 114 configured to store argument analysis information in association with interpreter identification information, a runtime control list storage unit 115 configured to store a runtime control list (first list), and a specific extension list storage unit 116 configured to store a specific extension list.

The executable whitelist stored in the executable whitelist storage unit 111 is a whitelist of executable-format applications and modules. The executable whitelist holds the file path name of an executable allowed to run and a hash value for ensuring the integrity of the executable in association with each other. The file path name may be a set of an inode number and a device number and may be any information that have a feature uniquely identifying the file. The hash value is generated based on data of the file. To generate a hash value, algorithms, such as HMAC, MD5, SHA-3, SHA-2, and SHA-1, may be used. Any algorithms that can generate a value having a feature capable of ensuring the integrity of a file can be employed.

The interpreter whitelist stored in the interpreter whitelist storage unit 112 is a whitelist of interpreters. The interpreter whitelist holds the file path name of an interpreter allowed to run, a hash value for ensuring the integrity of the interpreter, and interpreter identification information in association with each other. The interpreter identification information may be an interpreter name, such as Java (registered trademark), Python, Ruby, Perl, JavaScript (registered trademark), PHP, PerlScript, Lua, and VBScript. Any information that can identify an interpreter may be employed.

The script whitelist stored in the script whitelist storage unit 113 is a whitelist of script-format applications and modules. The script whitelist holds the file path name of a script file allowed to run, a hash value for ensuring the integrity of the script file, and interpreter identification information of an interpreter that runs the script file, in association with each other. Script files allowed to run may be classified according to the interpreter that executes a script file so that the script file associated with the interpreter can be identified based on the interpreter identification information.

The executable whitelist, the interpreter whitelist, and the script whitelist may be integrated into a single whitelist to be used. In this case, the path name of an executable in the executable whitelist may be recorded in association with interpreter identification information representing the executable.

The argument analysis information stored in the argument analysis information storage unit 114 in association with interpreter identification information is information indicating an argument analysis method in the interpreter. For example, the argument analysis information includes information, such as "'-o' argument is not followed by an argument" and "the next after '-c' argument is a script file". The argument analysis information may also include a definition that the starting of a process is stopped if a particular argument exists. The argument analysis information is used for performing whitelist execution control only for a script file in the argument during starting of an interpreter. The argument analysis information storage unit 114 may not be provided if whitelist execution control is performed for all the files in the argument during starting of an interpreter.

The runtime control list stored in the runtime control list storage unit 115 is a list in which, of the processes 13 in operation, specifically a process of an interpreter (an example of the specific process) is registered. When a process 13 of an interpreter is in operation, the runtime control list holds the process identifier (pid) identifying the process 13 and the interpreter identification information in association with each other. The process 13 managed by the OS 12 is uniquely identified by pid. The information held by the runtime control list is any information that can identify the process 13 of the interpreter in operation, and thread identifier (tid) may be used instead of pid.

In the present embodiment, only a process of an interpreter as a specific process is registered in the runtime control list. However, a process other than the specific process may be registered in the runtime control list, and the specific process may be registered such that the process can be identified as a specific process. For example, when the specific process is an interpreter, the interpreter identification information is associated with pid and registered in the runtime control list as described above, so that the interpreter can be identified even in the case where a process other than the interpreter is registered in the runtime control list.

The specific extension list stored in the specific extension list storage unit 116 is a list of specific extensions defined by interpreters registered in the interpreter whitelist. The specific extension list holds interpreter identification information and a specific extension associated with each other. The specific extension is defined for each interpreter. For example, when the interpreter is Perl, p1 and pm are specific extensions. The file with a specific extension is a script file to be executed by the interpreter corresponding to the specific extension.

The start process control unit 101 makes a determination for whitelisting execution control for a start process that is a process 13 requested to start, based on a notice from the start processing unit 21 of the OS 12. That is, the start process control unit 101 receives a notice to start a process 13 from the start processing unit 21, then determines whether to allow the process 13 to start, using the executable whitelist, the interpreter whitelist, the script whitelist, and the like, and notifies the start processing unit 21 of the determination result. If the determination result of the start process control unit 101 is to allow starting, the start processing unit 21 starts the process 13. If the determination result is to prohibit starting, the start processing unit 21 performs predetermined error processing without starting the process 13.

If the process 13 determined to be allowed to start is an interpreter, the start process control unit 101 registers the pid of the process 13 in association with the interpreter identification information into the runtime control list.

The copy process control unit 102 performs the processing of additionally registering a copy process, which is the copied process 13, into the runtime control list, based on a notice from the copy processing unit 22 of the OS 12. That is, the copy process control unit 102 receives, from the copy processing unit 22, a notice to copy a process 13 including the pid of parent process that is the copy source process 13 and the pid of child process that is the copy destination process 13 and then determines whether the parent process is an interpreter registered in the runtime control list. If the parent process is an interpreter registered in the runtime control list, the pid of the child process is additionally registered into the runtime control list in association with the interpreter identification information.

The termination process control unit 103 performs the processing of deleting a termination process that is a process 13 to be terminated from the runtime control list, based on a notice from the termination processing unit 23 of the OS 12. That is, the termination process control unit 103 receives a notice to terminate a process 13 from the termination processing unit 23 and then determines whether the process 13 to be terminated is an interpreter registered in the runtime control list. If the process 13 to be terminated is an interpreter registered in the runtime control list, the pid of the process and the interpreter identification information are deleted from the runtime control list.

The file read detection unit 104 detects a request to read a file by an interpreter registered in the runtime control list, based on a notice from the file reading unit 24 of the OS 12. That is, the file read detection unit 104 receives a file read notice including the file path name of the file requested to be read and the pid of the process 13 requesting to read a file from the file reading unit 24 and then checks the runtime control list for the pid. If the pid is registered in the runtime control list, it is determined that the request to read a file is made by an interpreter. The file read detection unit 104 passes the interpreter identification information registered in the runtime control list in association with the pid of the interpreter requesting to read a file and the file path name of the file requested to be read, to the determination unit 105, and asks the determination unit 105 whether to allow reading a file. If the pid of the process 13 requesting to read a file is not registered in the runtime control list, the file read detection unit 104 gives a notice to allow reading a file to the file reading unit 24, so that file reading is performed.

The determination unit 105 makes a determination for whitelisting execution control for, among files requested to be read by an interpreter, a file with a specific extension included in the specific extension list, that is, a script-format module. That is, if the file requested to be read by an interpreter is not provided with a specific extension, the file is a file (file not to be executed) treated as mere data that is not program codes, and therefore the determination unit 105 allows reading the file. When the file requested to be read by an interpreter is provided with a specific extension, the file is a script file storing a script-format module, and therefore the determination unit 105 determines whether to allow reading the file, using the script whitelist. The file reading unit 24 is notified of the determination result of the determination unit 105 through the file read detection unit 104. The file reading unit 24 controls reading of the file by the interpreter in accordance with the determination result of the determination unit 105.

Figure 3:
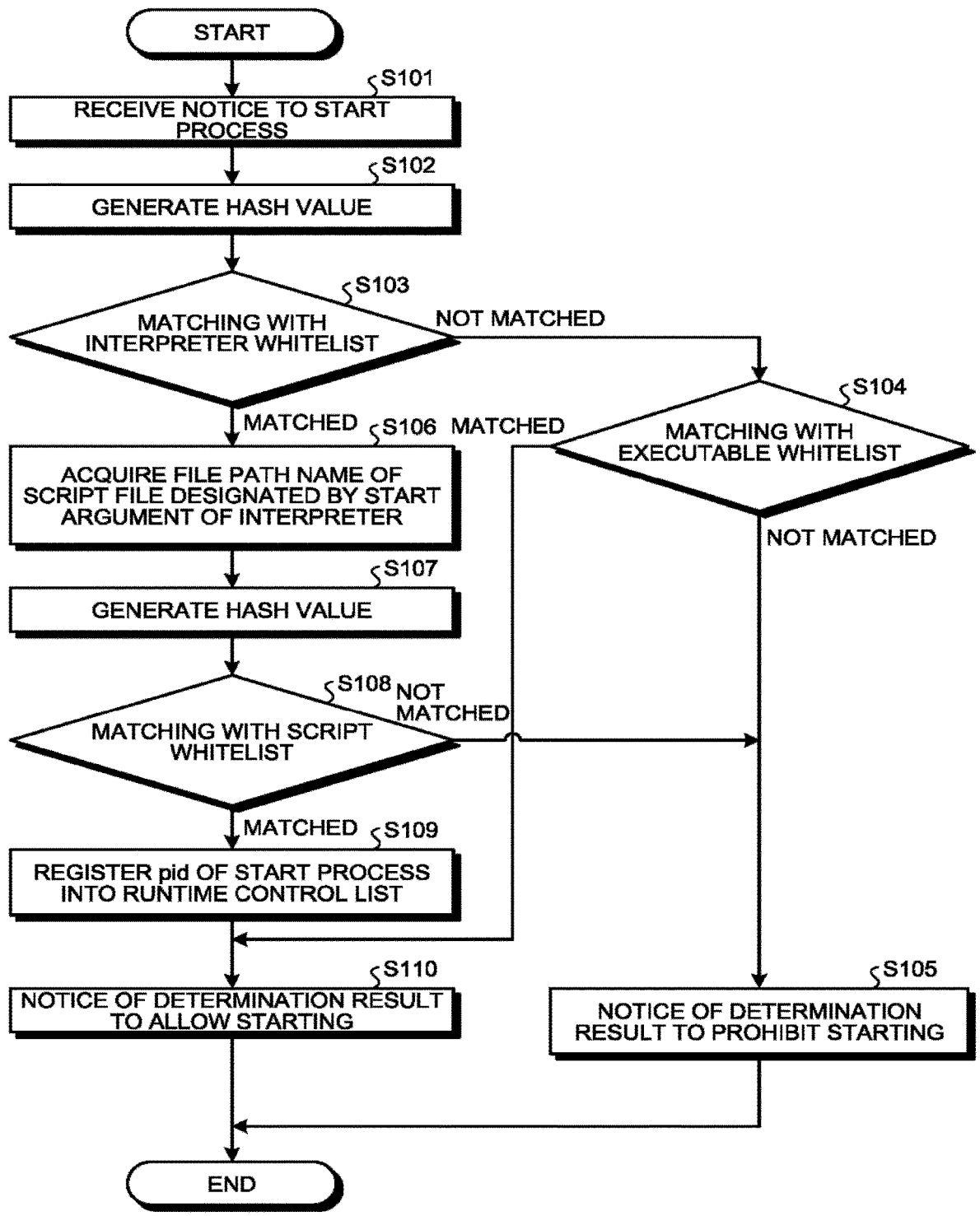
FIG. 3 is a flowchart illustrating an example of the procedure during process starting.

The operation of the information processing apparatus 10 according to the present embodiment will now be described with reference to a flowchart. First of all, the processing during process starting will be described. FIG. 3 is a flowchart illustrating an example of the procedure during process starting and illustrates an example of the procedure to be executed by the start process control unit 101 of the management process 14 when a notice to start a process 13 is given from the start processing unit 21 of the OS 12.

When a notice to start a process 13 is given from the start processing unit 21 of the OS 12, the start process control unit 101 of the management process 14 receives this notice (step S101). This notice includes the file path name of a start process, the start argument of the start process, and the pid of the start process. The start argument may not be directly received from the start processing unit 21 and may be acquired from a pseudo file system managed by the OS 12, for example, from proofs in the case of the Linux (registered trademark) OS environment.

Next, the start process control unit 101 generates a hash value from the file of the start process (step S102) and performs matching with the interpreter whitelist (step S103). That is, the start process control unit 101 determines whether a combination of the file path name of the start process and the hash value generated at step S102 matches any one of combinations of file path name and hash value registered in the interpreter whitelist.

Here, if the combination of the file path name of the start process and the hash value generated at step S102 does not match any one of combinations of file path name and hash value registered in the interpreter whitelist (not matched at step S103), then the start process control unit 101 performs matching with the executable whitelist (step S104). That is, the start process control unit 101 confirms whether the combination of the file path name of the start process and the hash value generated at step S102 matches any one of combinations of file path name and hash value registered in the executable whitelist.

Here, if the combination of the file path name of the start process and the hash value generated at step S102 does not match any one of combinations of file path name and hash value registered in the executable whitelist (not matched at step S104), the start process control unit 101 determines to prohibit starting the start process and notifies the start processing unit 21 of the determination result to prohibit starting (step S105).

On the other hand, if the combination of the file path name of the start process and the hash value generated at step S102 matches any one of combinations of file path name and hash value registered in the executable whitelist (matched at step S104), the start process control unit 101 determines to allow starting the start process and proceeds to step S110 to notify the start processing unit 21 of the determination result to allow starting.

If the combination of the file path name of the start process and the hash value generated at step S102 matches any one of combinations of file path name and hash value registered in the interpreter whitelist (matched at step S103), the start process control unit 101 specifies an argument analysis method from the argument analysis information, based on the interpreter identification information registered in the interpreter whitelist in association with the file path name and the hash value, and acquires the file path name of the script file designated by the start argument of the interpreter (step S106). The start process control unit 101 then generates a hash value from the script file (step S107) and performs matching with the script whitelist (step S108). That is, the start process control unit 101 confirms whether the combination of the file path name of the script file acquired at step S106 and the hash value generated at step S107 matches any one of combinations of file path name and hash value registered in the script whitelist.

Here, if the combination of the file path name of the script file acquired at step S106 and the hash value generated at step S107 does not match any one of combinations of file path name and hash value registered in the script whitelist (not matched at step S108), the start process control unit 101 determines to prohibit starting the start process and notifies the start processing unit 21 of the determination result to prohibit starting (step S105).

If the combination of the file path name of the script file acquired at step S106 and the hash value generated at step S107 matches any one of combinations of file path name and hash value registered in the script whitelist (matched at step S108), the start process control unit 101 determines to allow starting the interpreter that is the start process, registers the pid of the start process into the runtime control list (step S109), and notifies the start processing unit 21 of the determination result to allow starting (step S110).

Figure 4:
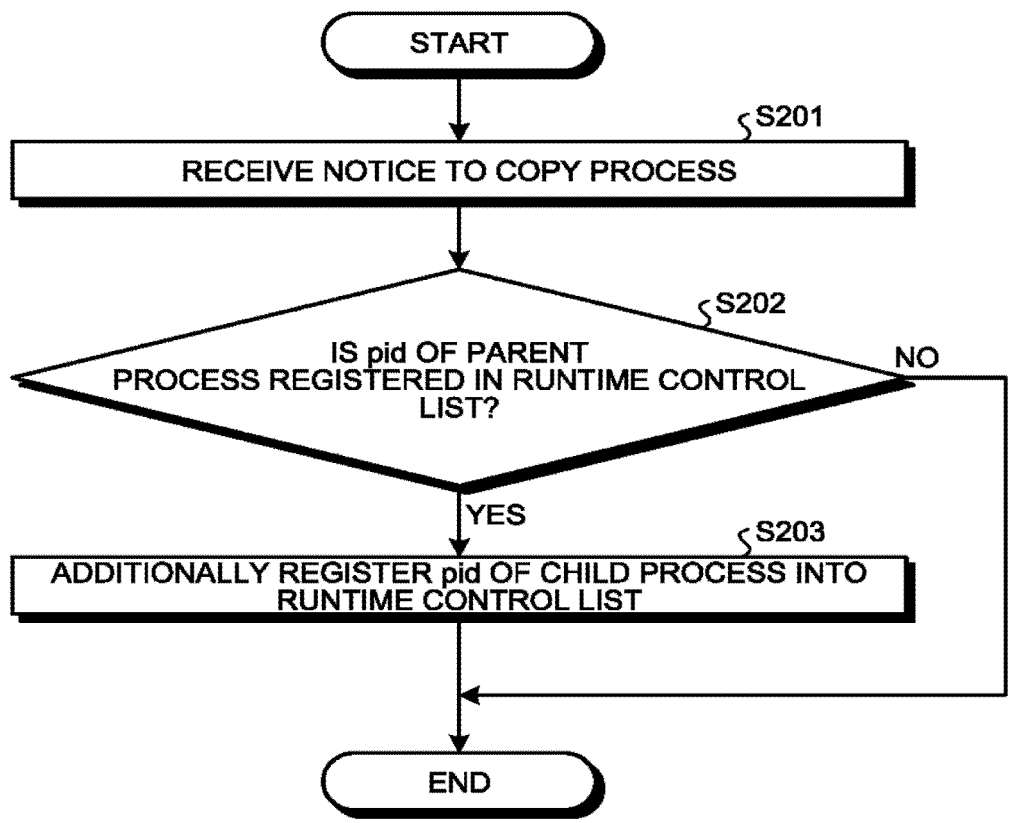
FIG. 4 is a flowchart illustrating an example of the procedure during process copying.

The processing during process copying will now be described. FIG. 4 is a flowchart illustrating an example of the procedure during process copying and illustrates an example of the procedure executed by the copy process control unit 102 of the management process 14 when the copy processing unit 22 of the OS 12 notifies the management process 14 to copy a process 13.

When a notice to copy a process 13 is given from the copy processing unit 22 of the OS 12, the copy process control unit 102 of the management process 14 receives this notice (step S201). This notice includes the pid of parent process that is the copy source process 13 and the pid of child process that is the copy destination process 13.

Next, the copy process control unit 102 determines whether the pid of the parent process received from the copy processing unit 22 is registered in the runtime control list (step S202). Then, if the pid of the parent process is registered in the runtime control list (Yes at step S202), the copy process control unit 102 determines that the process of the running interpreter has been copied, and additionally registers the pid of the child process received from the copy processing unit 22 into the runtime control list in association with the same interpreter identification information as the parent process (step S203). On the other hand, if the pid of the parent process is not registered in the runtime control list (No at step S202), the processing ends.

Figure 5:
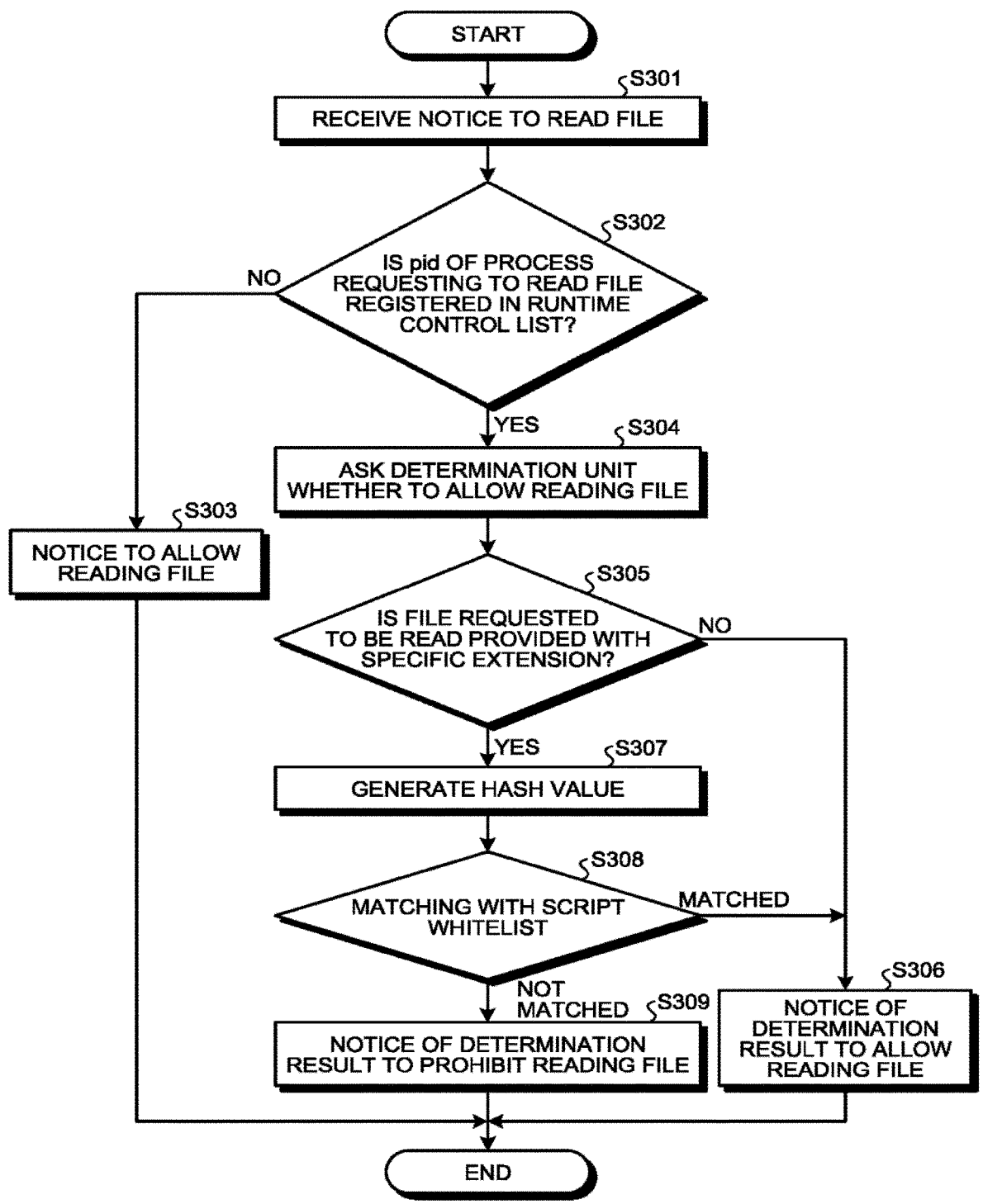
FIG. 5 is a flowchart illustrating an example of the procedure during file reading.

The processing during file reading will now be described. FIG. 5 is a flowchart illustrating an example of the procedure during file reading and illustrates an example of the procedure executed by the file read detection unit 104 and the determination unit 105 of the management process 14 when a notice to read a file is given from the file reading unit 24 of the OS 12.

When a notice to read a file is given from the file reading unit 24 of the OS 12, the file read detection unit 104 of the management process 14 receives this notice (step S301). This notice includes the file path name of the file requested to be read and the pid of the process 13 requesting to read a file.

Next, the file read detection unit 104 determines whether the pid of the process 13 requesting to read a file is registered in the runtime control list (step S302). Then, if the pid of the process 13 requesting to read a file is not registered in the runtime control list (No at step S302), the file read detection unit 104 determines that a file is to be read by an executable-format application and notifies the file reading unit 24 to allow reading a file (step S303).

On the other hand, if the pid of the process 13 requesting to read a file is registered in the runtime control list (Yes at step S302), the file read detection unit 104 determines that a file is to be read by a script-format application run by the interpreter and passes the file path name of the file requested to be read and the interpreter identification information retrieved from the runtime control list to the determination unit 105 to ask the determination unit 105 whether to allow reading the file (step S304).

The determination unit 105 asked by the file read detection unit 104 acquires the specific extension associated with the interpreter identification information received from the file read detection unit 104, from the specific extension list, and checks the file path name received from the file read detection unit 104 to determine whether the file requested to be read is provided with a specific extension (step S305). Here, if the file requested to be read is not provided with a specific extension (No at step S305), the determination unit 105 determines that the file requested to be read is a file (file not to be executed) to be treated as mere data that is not program codes, and returns the determination result to allow reading the file to the file read detection unit 104. The file read detection unit 104 in turn notifies the file reading unit 24 of the determination result to allow reading the file (step S306).

If the file requested to be read is not provided with a specific extension (No at step S305), the determination unit 105 determines that the file requested to be read is a script file, generates a hash value from the script file (step S307), and performs matching with the script whitelist (step S308). That is, the determination unit 105 confirms whether the combination of the file path name received from the file read detection unit 104 and the hash value generated at step S307 matches any one of combinations of file path name and hash value registered in the script whitelist.

Here, if the combination of the file path name received from the file read detection unit 104 and the hash value generated at step S307 does not match any one of combinations of file path name and hash value registered in the script whitelist (not matched at step S308), the determination unit 105 returns the determination result to prohibit reading the file to the file read detection unit 104, and the file read detection unit 104 in turn notifies the file reading unit 24 of the determination result to prohibit reading the file (step S309). On the other hand, if the combination of the file path name received from the file read detection unit 104 and the hash value generated at step S307 matches any one of combinations of file path name and hash value registered in the script whitelist (matched at step S308), the determination unit 105 returns the determination result to allow reading the file to the file read detection unit 104, and the file read detection unit 104 in turn notifies the file reading unit 24 of the determination result to allow reading the file (step S306).

Figure 6:
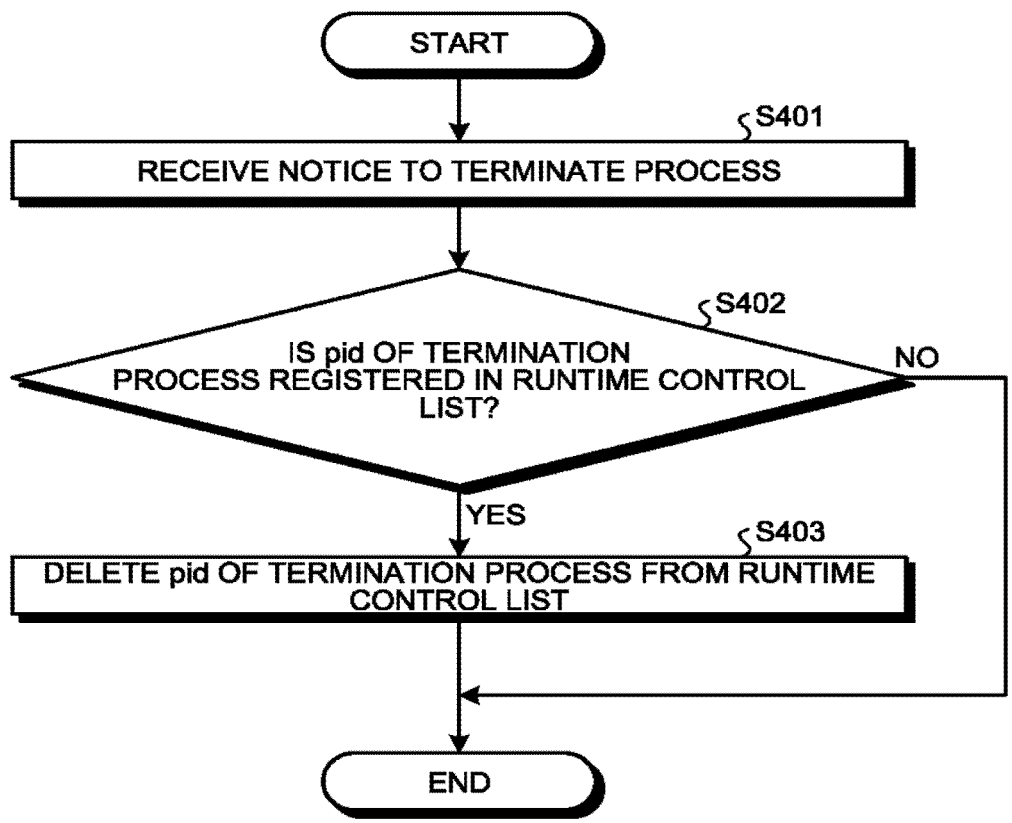
FIG. 6 is a flowchart illustrating an example of the procedure during process termination.

The processing during process termination will now be described. FIG. 6 is a flowchart illustrating an example of the procedure during process termination and illustrates an example of the procedure executed by the termination process control unit 103 of the management process 14 when a notice to terminate a process 13 is given from the termination processing unit 23 of the OS 12.

When a notice to terminate a process 13 is given from the termination processing unit 23 of the OS 12, the termination process control unit 103 of the management process 14 receives this notice (step S401). This notice includes the pid of the termination process.

Next, the termination process control unit 103 determines whether the pid of the termination process received from the termination processing unit 23 is registered in the runtime control list (step S402). Then, if the pid of the termination process is registered in the runtime control list (Yes at step S402), the termination process control unit 103 deletes the pid from the runtime control list (step S403). On the other hand, if the pid of the termination process is not registered in the runtime control list (No at step S402), the processing ends.

As explained in detail above with specific examples, the information processing apparatus 10 according to the present embodiment includes: the start process control unit 101 configured to register, of the started processes, a process of an interpreter that is a specific process into the runtime control list; the file read detection unit 104 configured to detect a request to read a file by a process of an interpreter registered in the runtime control list; the determination unit 105 configured to determine whether to allow reading the requested file by matching with the script whitelist; and the file reading unit 24 configured to control reading of the file in accordance with the determination result of the determination unit 105. The information processing apparatus 10 thus can implement whitelisting execution control for a script-format module.

In addition, the information processing apparatus 10 according to the present embodiment identifies whether the file requested to be read is a script file or a file treated as mere data, based on the specific extension defined by the interpreter, and performs reading control only for a script file storing a script-format module, thereby effectively avoiding excessive control.

First Modification to First Embodiment

In the foregoing first embodiment, the child process is additionally registered into the runtime control list if the parent process is registered in the runtime control list during process copying. Alternatively, the additional registration of the child process into the runtime control list may be delayed until a file is read by the child process.

Figure 7:
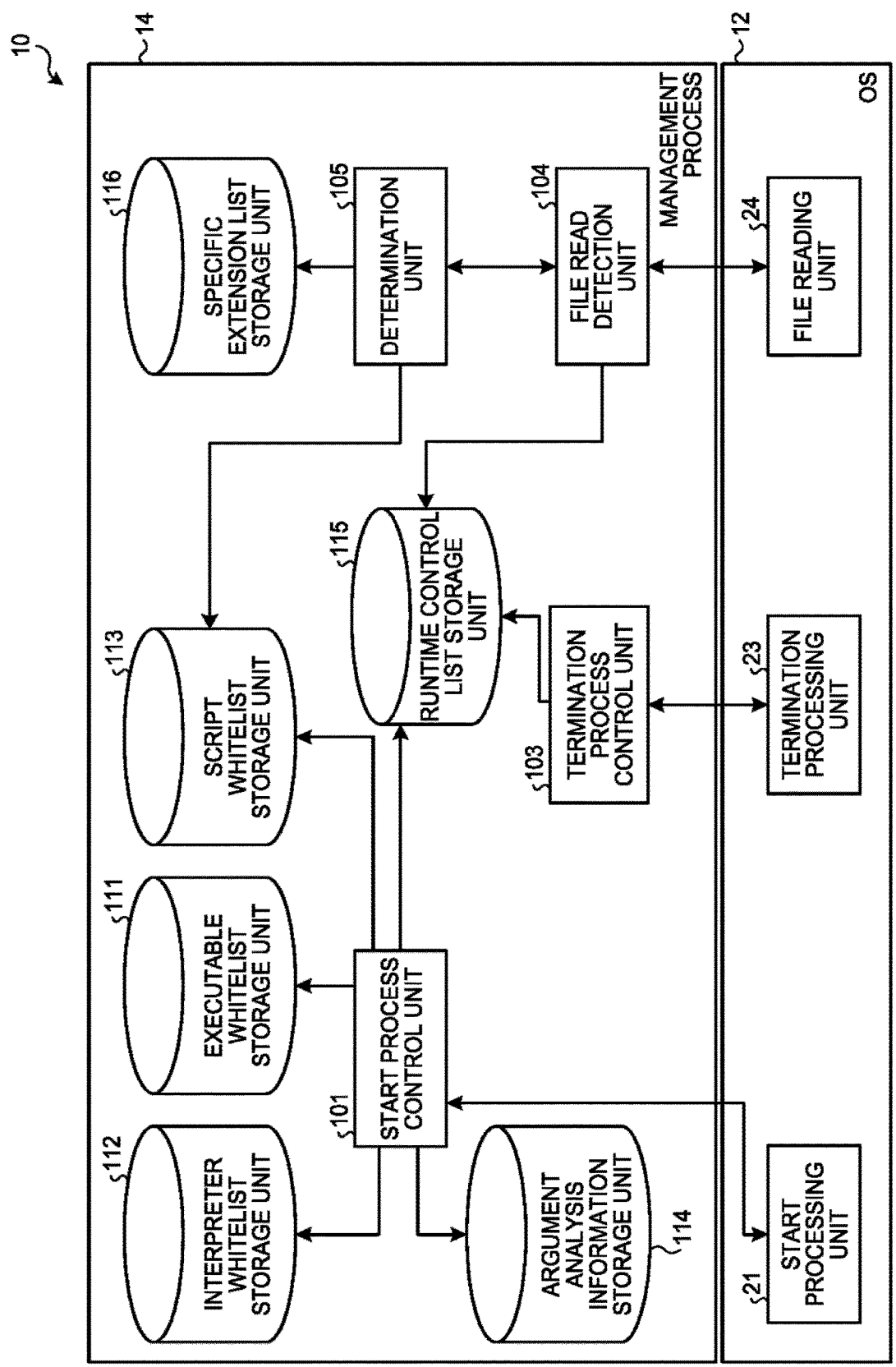
FIG. 7 is a block diagram illustrating a functional configuration example of the information processing apparatus according to a first modification.

FIG. 7 is a block diagram illustrating a functional configuration example of the information processing apparatus 10 according to the present modification. When compared with the configuration example illustrated in FIG. 3, the copy processing unit 22 of the OS 12 and the copy process control unit 102 of the management process 14 are omitted. Instead, the file read detection unit 104 has the function equivalent to the copy process control unit 102. That is, when the process 13 requesting to read a file is the child process of the interpreter registered in the runtime control list, the file read detection unit 104 performs the processing of additionally registering the pid of the process into the runtime control list.

Figure 8:
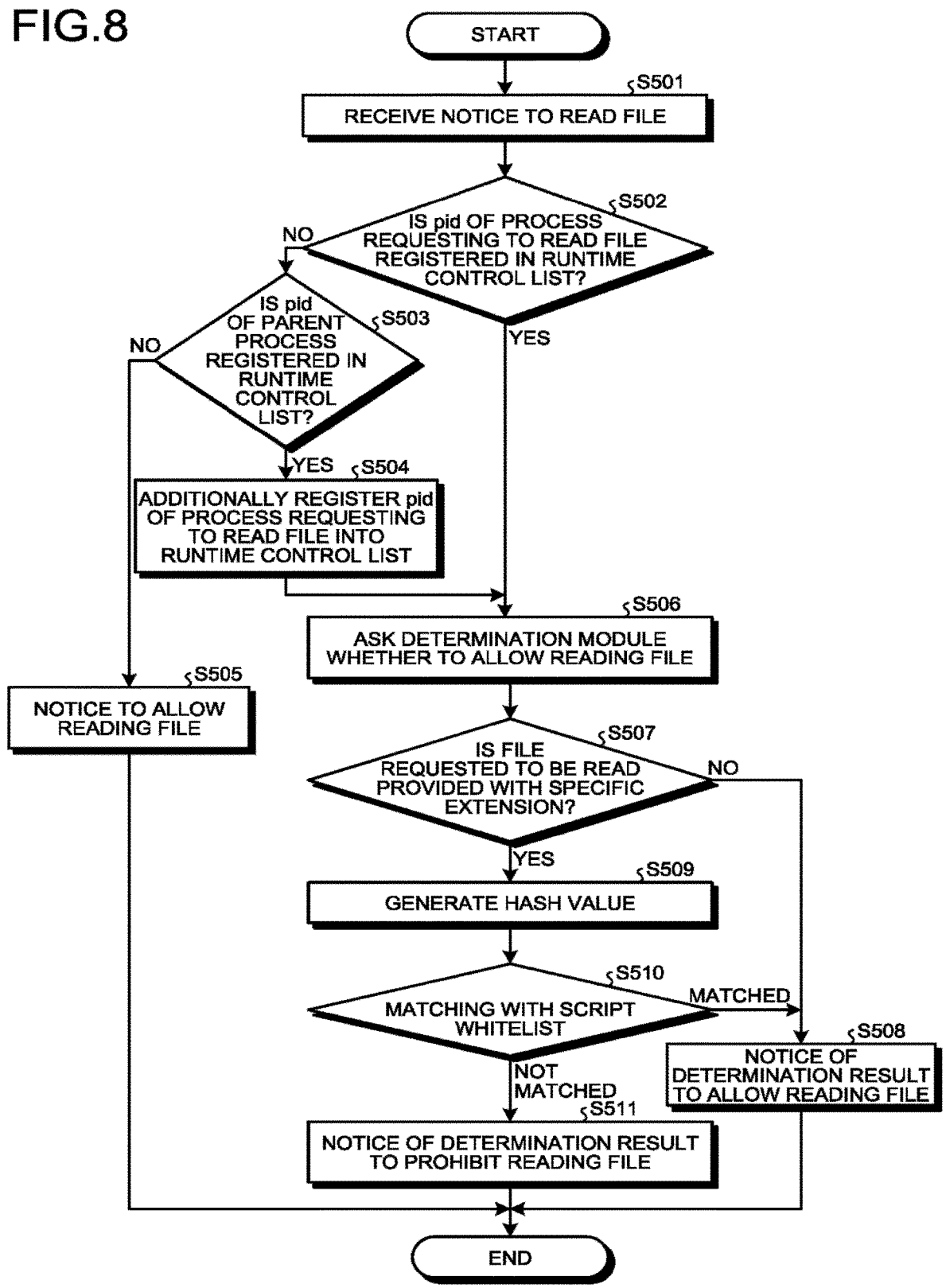
FIG. 8 is a flowchart illustrating an example of the procedure during file reading.

FIG. 8 is a flowchart illustrating an example of the procedure during file reading in the present modification and illustrates an example of the procedure executed by the file read detection unit 104 and the determination unit 105 of the management process 14 when a notice to read a file is given from the file reading unit 24 of the OS 12. The processing from step S505 to step S511 in FIG. 8 is similar to the processing from step S303 to step S309 in FIG. 5 and an overlapping description is omitted.

When a notice to read a file is given from the file reading unit 24 of the OS 12, the file read detection unit 104 of the management process 14 receives this notice (step S501). This notice includes, in addition to the file path name of the file requested to be read and the pid of the process 13 requesting to read a file, the pid of the copy-source parent process if the process 13 requesting to read a file is a child process copied from another process 13.

Next, the file read detection unit 104 determines whether the pid of the process 13 requesting to read a file is registered in the runtime control list (step S502). Then, if the pid of the process 13 requesting to read a file is not registered in the runtime control list (No at step S502), then it is determined whether the pid of the parent process of the process 13 is registered in the runtime control list (step S503). Here, if the pid of the parent process is also not registered in the runtime control list (No at step S503), the file read detection unit 104 determines that the file is to be read by an executable-format application and proceeds to step S505 to notify the file reading unit 24 of allowing reading a file.

On the other hand, if the pid of the parent process is registered in the runtime control list (Yes at step S503), the file read detection unit 104 determines that the file is to be read by a script-format application run by the interpreter and additionally registers the pid of the process requesting to read a file into the runtime control list in association with the interpreter identification information (step S504). Subsequently, the file read detection unit 104 proceeds to step S506 to pass the file path name of the file requested to be read and the interpreter identification information to the determination unit 105 and ask the determination unit 105 whether to allow reading the file.

As described above, in the present modification, the processing during process copying is integrated into the processing during file reading, thereby achieving the effect of reducing overhead of running speed.

Second Modification to First Embodiment

In the foregoing first embodiment, during termination of a process, if the process to be terminated is an interpreter registered in the runtime control list, the interpreter is deleted from the runtime control list. Alternatively, this processing of terminating a process may be performed at the same time when a process is started.

Figure 9:
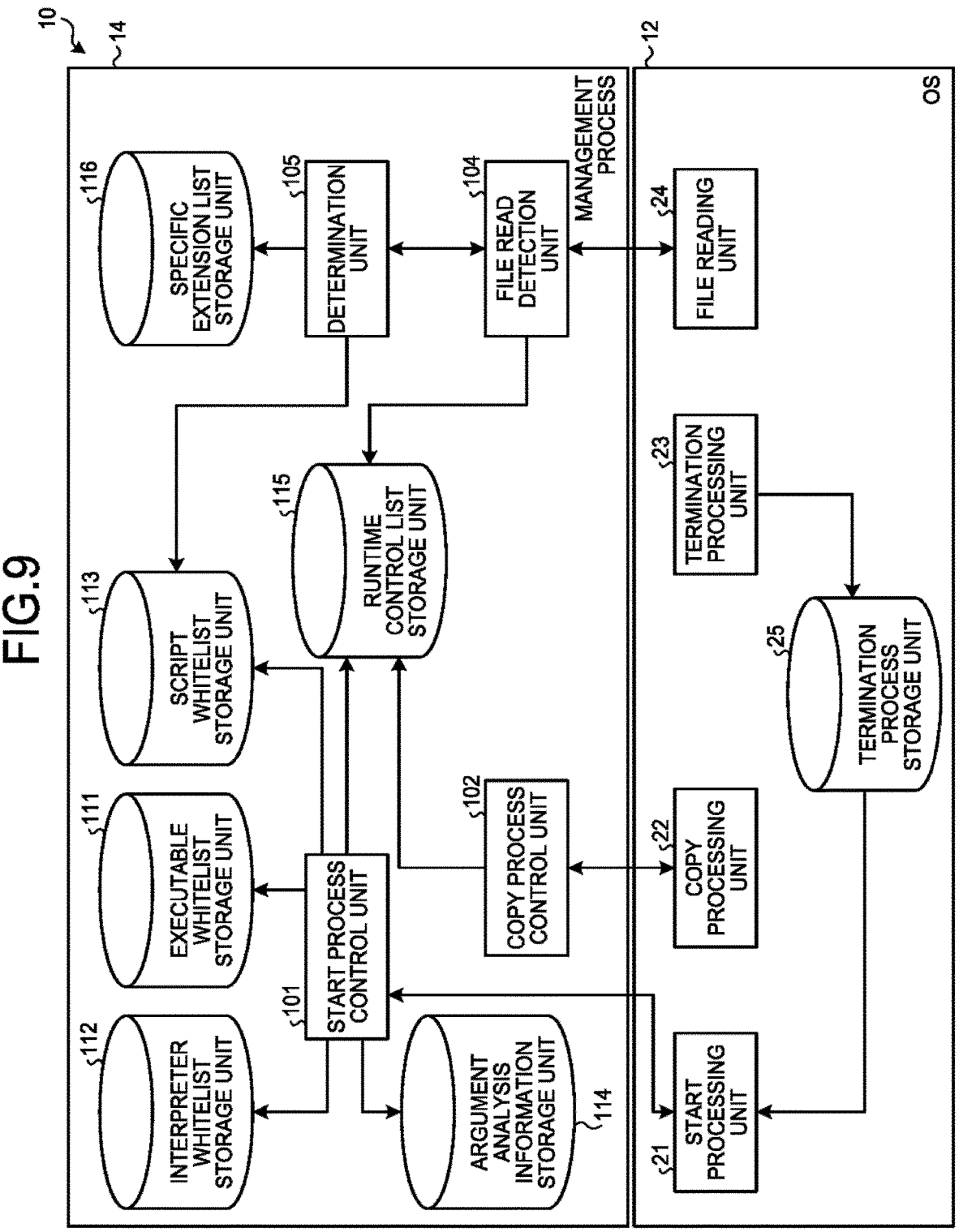
FIG. 9 is a block diagram illustrating a functional configuration of the information processing apparatus according to a second modification.

FIG. 9 is a block diagram illustrating a functional configuration example of the information processing apparatus 10 according to the present modification. When compared with the configuration example illustrated in FIG. 3, the termination process control unit 103 of the management process 14 is omitted, and instead, a termination process storage unit 25 is added to the OS 12. In the present modification, the termination processing unit 23 of the OS 12 temporarily stores the pid of a termination process in the termination process storage unit 25, rather than notifying the management process 14 to terminate the process 13 during process termination. The start processing unit 21 then retrieves the pid of the termination process from the termination process storage unit 25 during process starting and notifies the start process control unit 101 of the pid of this termination process.

Figure 10:
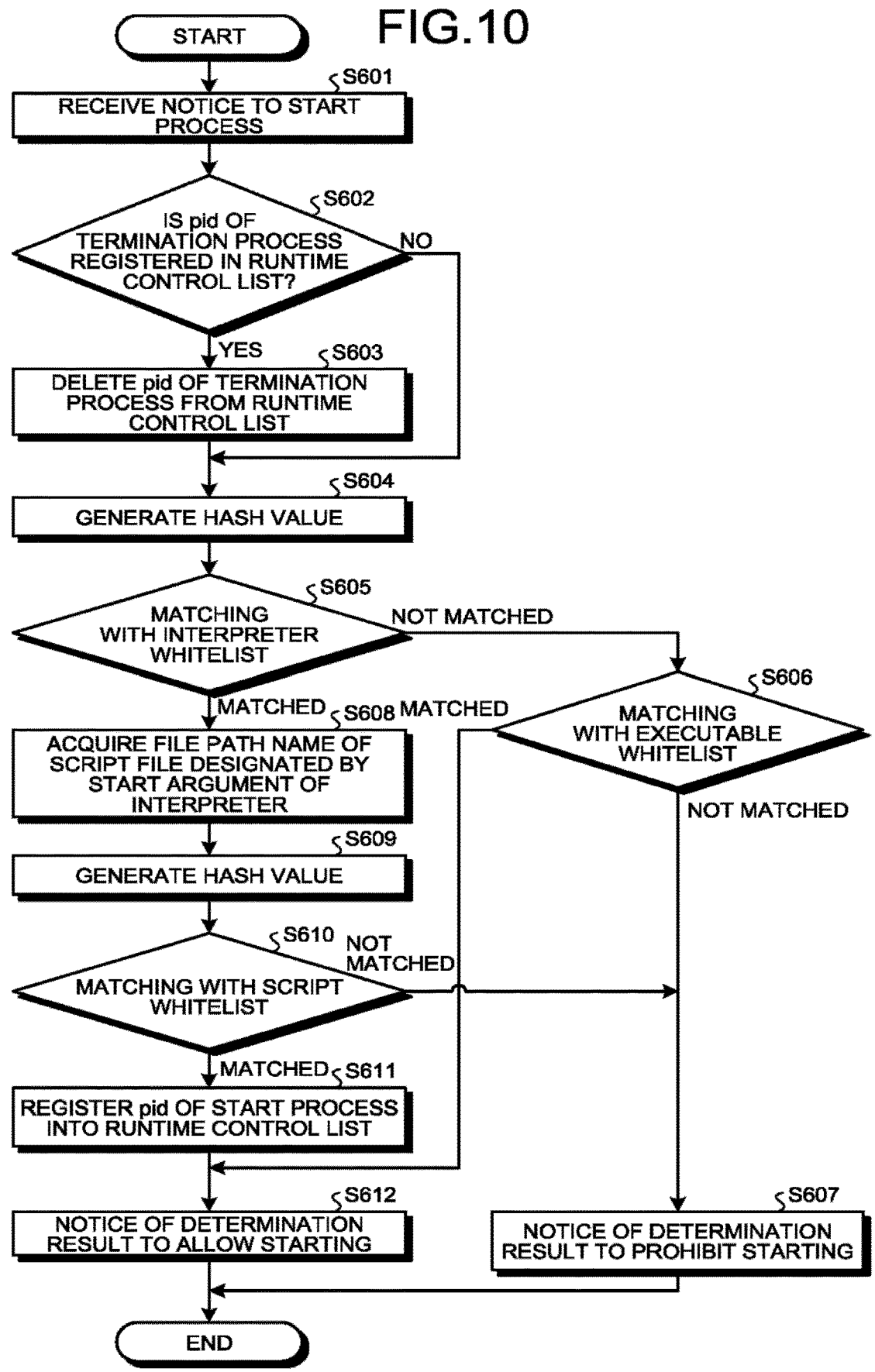
FIG. 10 is a flowchart illustrating an example of the procedure during process starting.

FIG. 10 is a flowchart illustrating an example of the procedure during process starting in the present modification and illustrates an example of the procedure executed by the start process control unit 101 of the management process 14 when a notice to start a process 13 is given from the start processing unit 21 of the OS 12. The processing from step S604 to step S612 in FIG. 10 is similar to the processing from step S102 to step S110 in FIG. 3 and an overlapping description is omitted.

When a notice to start a process 13 is given from the start processing unit 21 of the OS 12, the start process control unit 101 of the management process 14 receives this notice (step S601). This notice includes, in addition to the file path name of the start process, the start argument of the start process, the pid of the start process, and the pid of the termination process retrieved by the start processing unit 21 from the termination process storage unit 25.

Next, the start process control unit 101 determines whether the pid of the termination process received from the start processing unit 21 is registered in the runtime control list (step S602). Then, if the pid of the termination process is registered in the runtime control list (Yes at step S602), the start process control unit 101 deletes the pid from the runtime control list (step S603) and proceeds to step S604. If the pid of the termination process is not registered in the runtime control list (No at step S602), the start process control unit 101 proceeds to step S604.

As described above, in the present modification, the processing during process termination is integrated into the processing during process starting, thereby achieving the effect of reducing overhead of running speed.

Second Embodiment

A second embodiment will now be described. The second embodiment is intended to reduce processing load by holding the result of matching with the whitelist (whether starting of a process 13 or reading of a file is allowed by matching with the whitelist) in a cache and eliminating the repetition of matching processing.

Figure 11:
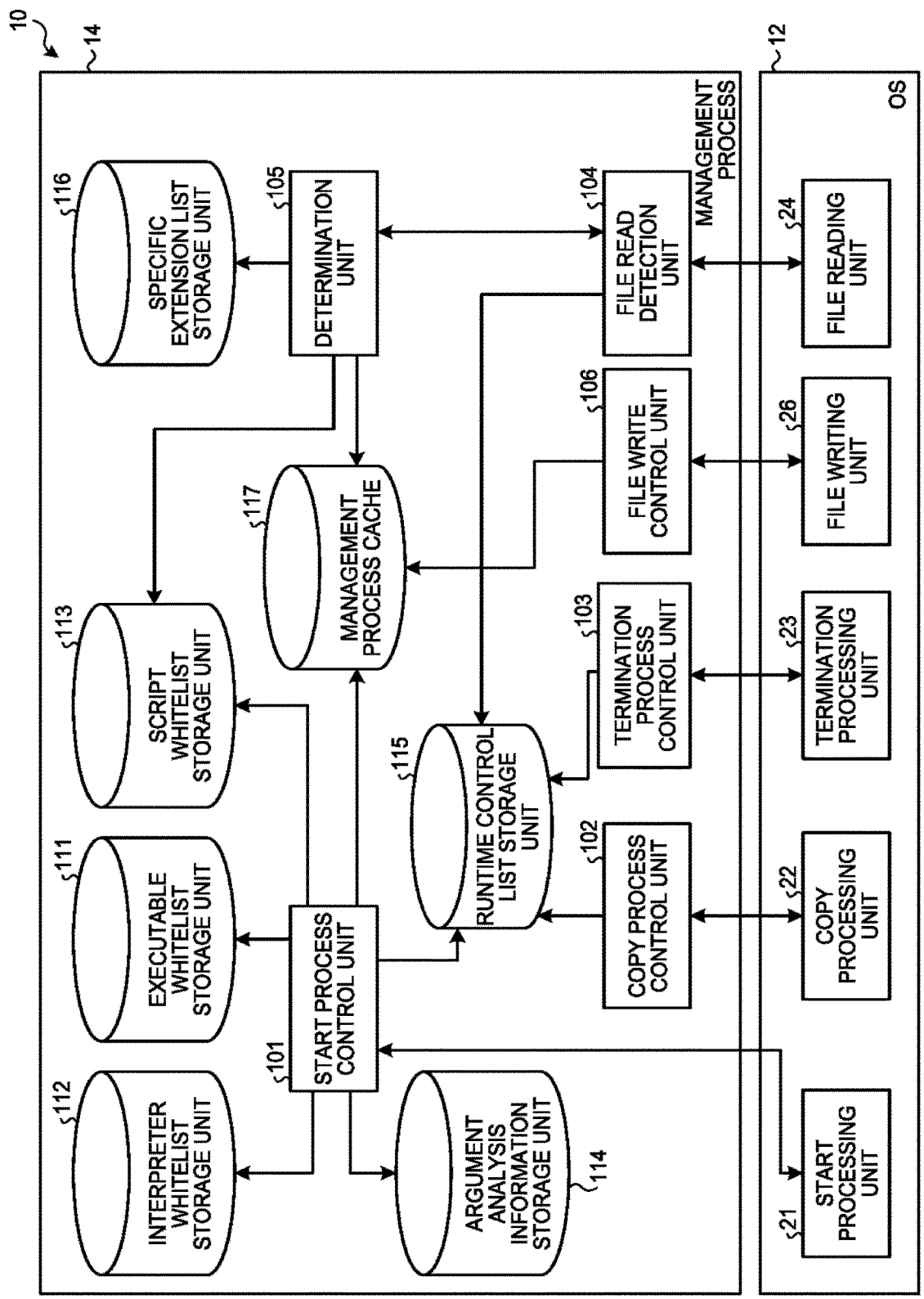
FIG. 11 is a block diagram illustrating a functional configuration example of the information processing apparatus according to a second embodiment.

FIG. 11 is a block diagram illustrating a functional configuration example of the information processing apparatus 10 according to the second embodiment. FIG. 11 differs from the configuration example of the first embodiment illustrated in FIG. 3 in that the management process 14 includes a management process cache 117 for holding the result of matching with the whitelist and a file write control unit 106, and the OS 12 includes a file writing unit 26 configured to perform write processing on a file.

The management process cache 117 holds, for example, a hash key calculated based on the file path name, the result of matching of the file specified by the file path name with the whitelist, and, in addition, if the file is a script file, interpreter identification information identifying the interpreter that executes the script file, in association with each other as cache information. The hash key may be any value that can be calculated from information that can identify a file and may be a combination of inode number and device number. As for the matching result, a value that can identify whether the previous matching result is to allow or to prohibit is held. In a configuration in which only the previous matching result to allow or the previous matching result to prohibit is held in the management process cache 117, it is not necessary to hold information indicating the matching result, because whether the matching result is to permit or the matching result is to prohibit can be known by whether the hash key calculated based on the file path name is held.

The replacement algorithm of the management process cache 117 may be any algorithm having the feature of displacing cache information likely to be unnecessary when new cache information is registered. For example, replacement algorithms, such as Least Recently Used (LRU), Most Recently Used (MRU), Pseudo-LRU (PLRU), Least Frequently Used (LFU), and Adaptive Replacement Cache (ARC) may be used.

The file write control unit 106 deletes cache information corresponding to the file requested to be written, among cache information held by the management process cache 117, based on a notice from the file writing unit 26 of the OS 12. That is, the file write control unit 106 receives a file write notice including the file path name of the file requested to be written and the pid of the process 13 requesting to write a file from the file writing unit 26 and then determines whether cache information relating to the file requested to be written is held in the management process cache 117, based on the hash key calculated from the file path name. Then, if cache information relating to the file requested to be written is held in the management process cache 117, the cache information is deleted. A status flag indicating enable/disable may be added to cache information, and the status flag of the cache information relating to the file requested to be written may be switched from enable to disable. In this case, in matching with the management process cache 117, only the cache information with the status flag enabled is referenced. After cache information relating to the file requested to be written is deleted from the management process cache 117, or when cache information relating to the file requested to be written is not held in the management process cache 117, the file write control unit 106 notifies the file writing unit 26 of the OS 12 to terminate the processing. The file writing unit 26, receiving this notice, performs writing on the file requested to be written.

Figure 12:
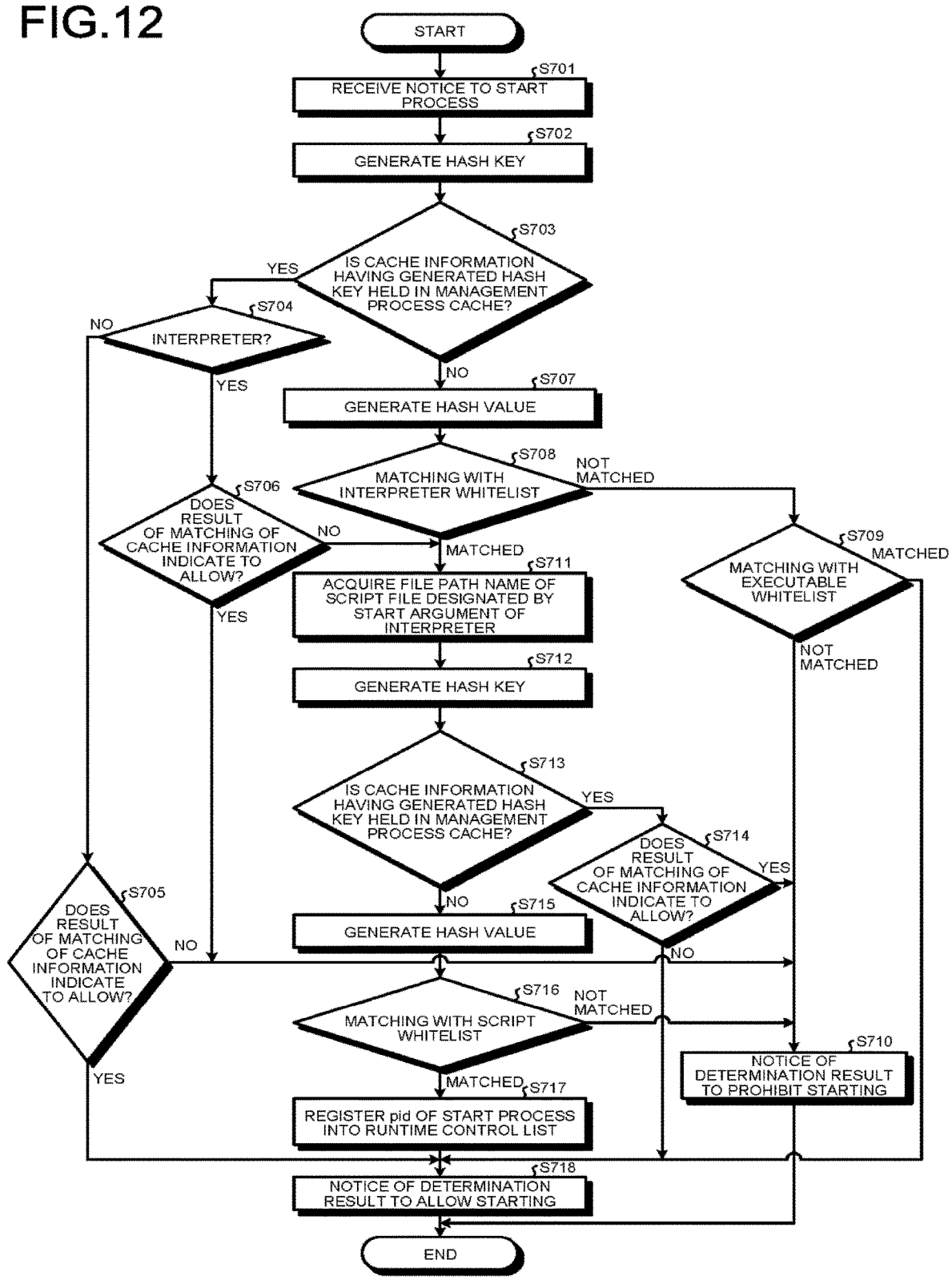
FIG. 12 is a flowchart illustrating an example of the procedure during process starting.

FIG. 12 is a flowchart illustrating an example of the procedure during process starting in the present embodiment and illustrates an example of the procedure executed by the start process control unit 101 of the management process 14 when a notice to start a process 13 is given from the start processing unit 21 of the OS 12. The processing from step S707 to step S711 in FIG. 12 is similar to the processing from step S102 to step S106 in FIG. 3, the processing from step S715 to step S718 in FIG. 12 is similar to the processing from step S107 to step S110 in FIG. 3, and therefore a detailed description of these steps is omitted where appropriate.

In the present embodiment, the start process control unit 101 receives a notice to start a process from the start processing unit 21 (step S701) and then generates a hash key based on the file path name of the start process included in this notice (step S702). Then, the start process control unit 101 refers to the management process cache 117 to confirm whether cache information having the hash key generated at step S702 is held in the management process cache 117 (step S703).

Here, if cache information having the hash key generated at step S702 is held in the management process cache 117 (Yes at step S703), the start process control unit 101 determines whether the cache information relates to a file of an interpreter (step S704). Then, in the case where the cache information does not relate to a file of an interpreter, that is, it relates to an executable (No at step S704), if the previous matching result included in the cache information indicates to prohibit (No at step S705), then the processing proceeds to step S710 to notify the start processing unit 21 of the determination result to prohibit starting. If the previous matching result indicates to allow (Yes at step S705), the processing proceeds to step S718 to notify the start processing unit 21 of the determination result to allow starting.

In the case where cache information having the hash key generated at step S702 relates to a file of an interpreter (Yes at step S704), if the previous matching result included in the cache information indicates to prohibit (No at step S706), the processing proceeds to step S710 to notify the start processing unit 21 of the determination result to prohibit starting. If the previous matching result indicates to allow (Yes at step S706), the processing proceeds to step S711 to acquire the file path name of the script file designated by the start argument of the interpreter. Thereafter, a hash key is generated based on the file path name of the script file (step S712). Then, the start process control unit 101 confirms whether cache information having the hash key generated at step S712 is held in the management process cache 117 (step S713).

Here, in the case where cache information having the hash key generated at step S712 is held in the management process cache 117 (Yes at step S713), if the previous matching result included in the cache information indicates to prohibit (No at step S714), the processing proceeds to step S710 to notify the start processing unit 21 of the determination result to prohibit starting. If the previous matching result indicates to allow (Yes at step S714), the processing proceeds to step S718 to notify the start processing unit 21 of the determination result to allow starting.

If cache information having the hash key generated at step S712 is not held in the management process cache 117 (No at step S713), the processing proceeds to step S715. Subsequently, matching with the script whitelist and notification of the determination result to the start processing unit 21 are performed in the same manner as in the first embodiment. In this case, the start process control unit 101 records the result of matching with the script whitelist as cache information into the management process cache 117 in association with the hash key generated at step S712 and the interpreter identification.

In step S703 above, if it is determined that cache information having the hash key generated at step S702 is not held in the management process cache 117 (No at step S703), the processing proceeds to step S707. Subsequently, in the same manner as in the first embodiment, matching with the interpreter whitelist and the executable whitelist, and, in addition, if there is a match in the interpreter whitelist, matching with the script whitelist are performed, and the start processing unit 21 is notified of the determination result according to the matching result. If the result of matching with the script whitelist indicates to allow, the pid of the start process is registered into the runtime control list. In the present embodiment, before performing matching with the script whitelist, it is confirmed whether cache information relating to the script file is held in the management process cache 117 as described above. If it is held, the start processing unit 21 is notified of the determination result according to the previous matching result.

Also in this case, the start process control unit 101 records the result of matching with the interpreter whitelist or the executable whitelist as cache information into the management process cache 117 in association with the hash key generated at step S702. When matching with the script whitelist is performed, the result of matching with the script whitelist is recorded as cache information into the management process cache 117 in association with the hash key generated at step S712 and interpreter identification.

Figure 13:
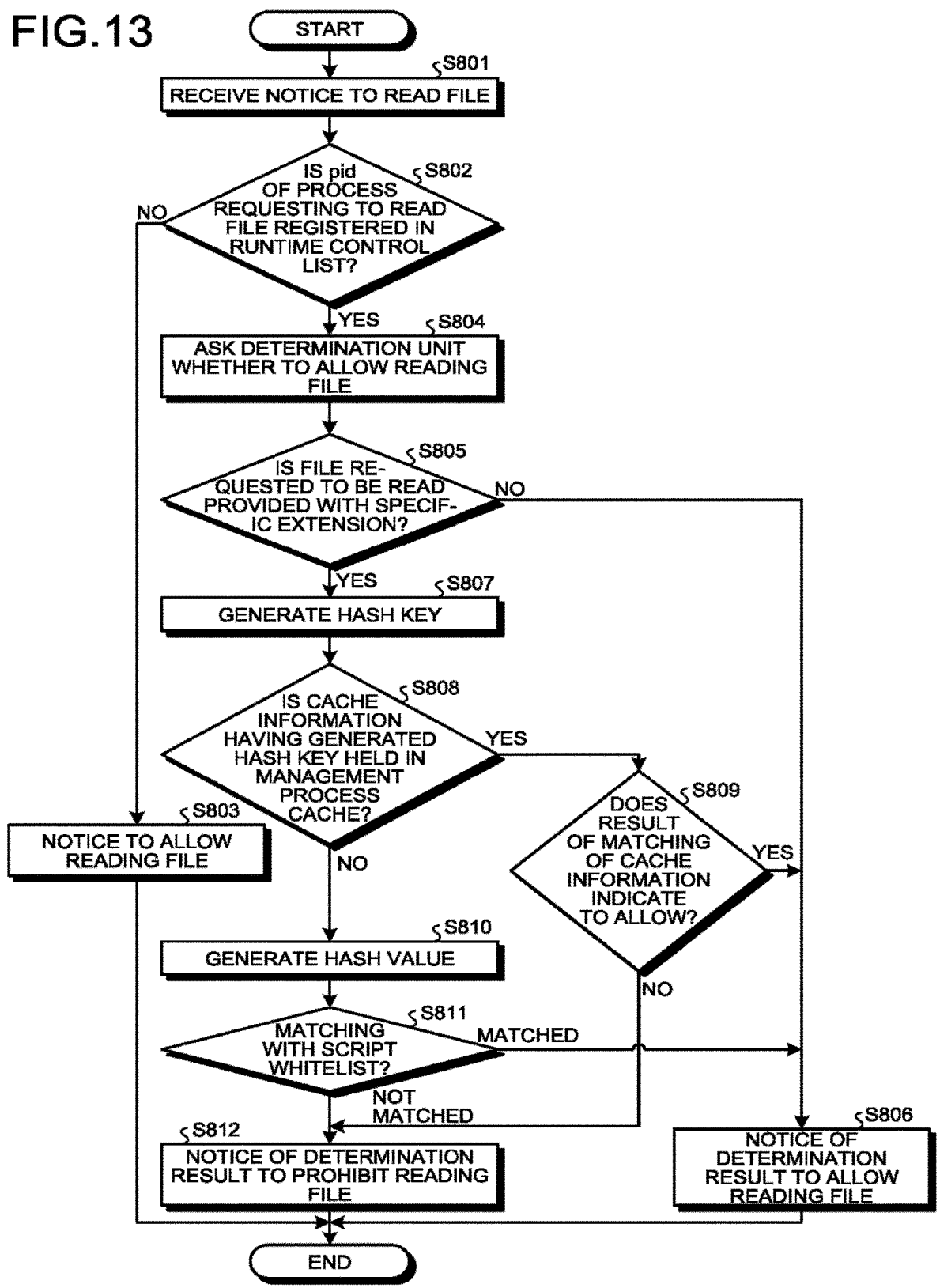
FIG. 13 is a flowchart illustrating an example of the procedure during process reading.

FIG. 13 is a flowchart illustrating an example of the procedure during file reading in the present embodiment and illustrates an example of the procedure executed by the file read detection unit 104 and the determination unit 105 of the management process 14 when a notice to read a file is given from the file reading unit 24 of the OS 12. The processing from step S801 to step S806 in FIG. 13 is similar to the processing from step S301 to step S306 in FIG. 5, and the processing from step S810 to step S812 in FIG. 13 is similar to the processing from step S307 to step S309 in FIG. 5. Therefore, a detailed description of these steps is omitted where appropriate.

In the present embodiment, if the file requested to be read is provided with a specific extension (Yes at step S805), the determination unit 105 determines that the file is a script file and then generates a hash key first, based on the file path name of the path (step S807). Then, the determination unit 105 refers to the management process cache 117 to determine whether cache information having the hash key generated at step S807 is held in the management process cache 117 (step S808).

Here, if cache information having the hash key generated at step S807 is held in the management process cache 117 (Yes at step S808), the determination unit 105 confirms whether the previous matching result included in the cache information indicates to allow (step S809). Then, if the previous matching result indicates to allow (Yes at step S809), the determination unit 105 returns the determination result to allow reading the file to the file read detection unit 104, and the file read detection unit 104 in turn notifies the file reading unit 24 of the determination result to allow reading the file (step S806). If the previous matching result indicates to prohibit (No at step S809), the determination unit 105 returns the determination result to prohibit reading the file to the file read detection unit 104, and the file read detection unit 104 in turn notifies the file reading unit 24 of the determination result to prohibit reading the file (step S812).

If cache information having the hash key generated at step S807 is not held in the management process cache 117 (No at step S808), the processing proceeds to step S810, and subsequently, matching with the script whitelist and notification of the determination result to the file reading unit 24 are performed in the same manner as in the first embodiment. In this case, the determination unit 105 records the hash key generated at step S807, the result of matching with the script whitelist, and the interpreter identification in association with each other as cache information into the management process cache 117.

Figure 14:
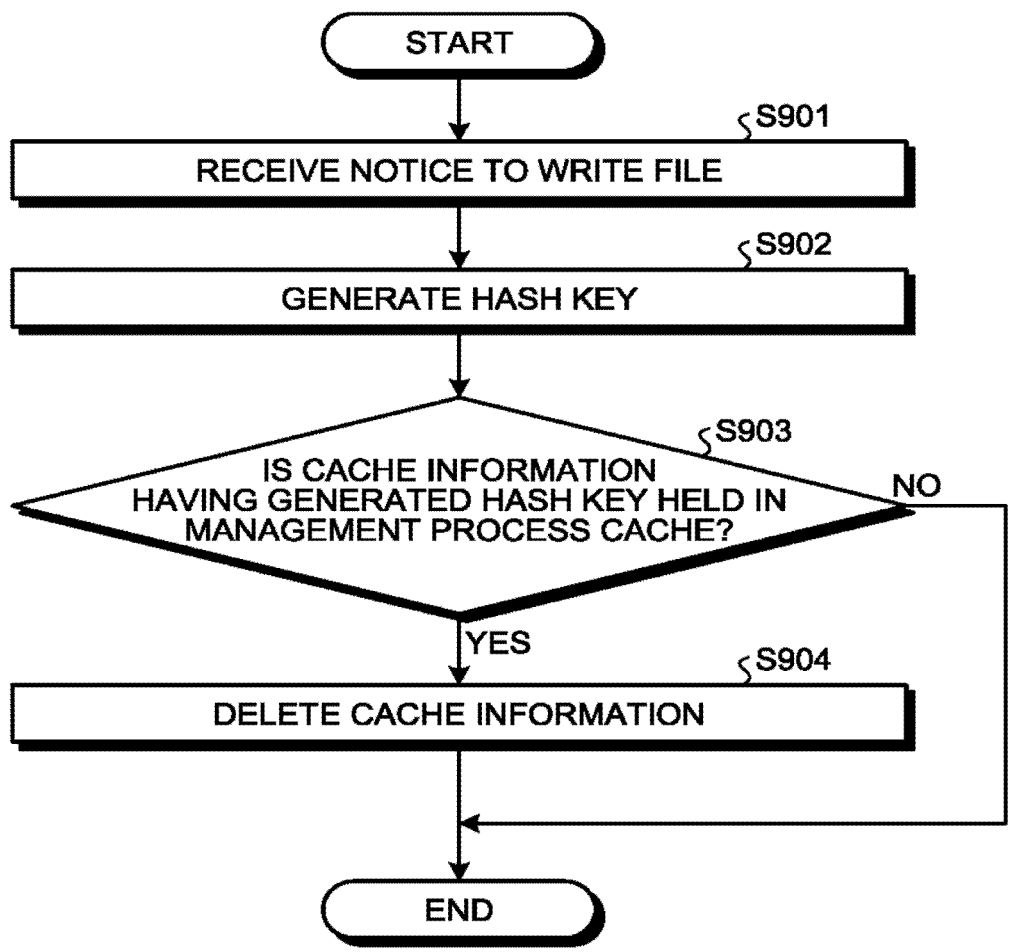
FIG. 14 is a flowchart illustrating an example of the procedure during process writing.

FIG. 14 is a flowchart illustrating an example of the procedure during file writing in the present embodiment and illustrates an example of the procedure executed by the file write control unit 106 of the management process 14 when a notice to write a file is given from the file writing unit 26 of the OS 12.

If a notice to write a file is given from the file writing unit 26 of the OS 12, the file write control unit 106 of the management process 14 receives this notice (step S901). This notice includes the file path name of the file to be written and the pid of the process 13 requesting to write a file.

Next, the file write control unit 106 generates a hash key based on the file path name received from the file writing unit 26 (step S902) and confirms whether cache information having the generated hash key is held in the management process cache 117 (step S903). Then, if cache information having the hash key generated at step S902 is held in the management process cache 117 (Yes at step S903), the file write control unit 106 deletes the cache information from the management process cache 117 (step S904). If cache information having the hash key generated at step S902 is not held in the management process cache 117 (No at step S903), the processing ends.

As described above, the information processing apparatus 10 according to the present embodiment is configured to hold the result of previous matching with the whitelist in the management process cache 117, and if the same file is repeatedly accessed, refer to the management process cache 117 to perform execution control in accordance with the previous matching result. This configuration can eliminate the repetition of matching processing and thereby reduce processing load.

Modification to Second Embodiment

In the foregoing second embodiment, the cache for holding the result of matching with the whitelist is provided on the management process 14 side. Alternatively, such a cache may be provided on the OS 12 side.

Figure 15:
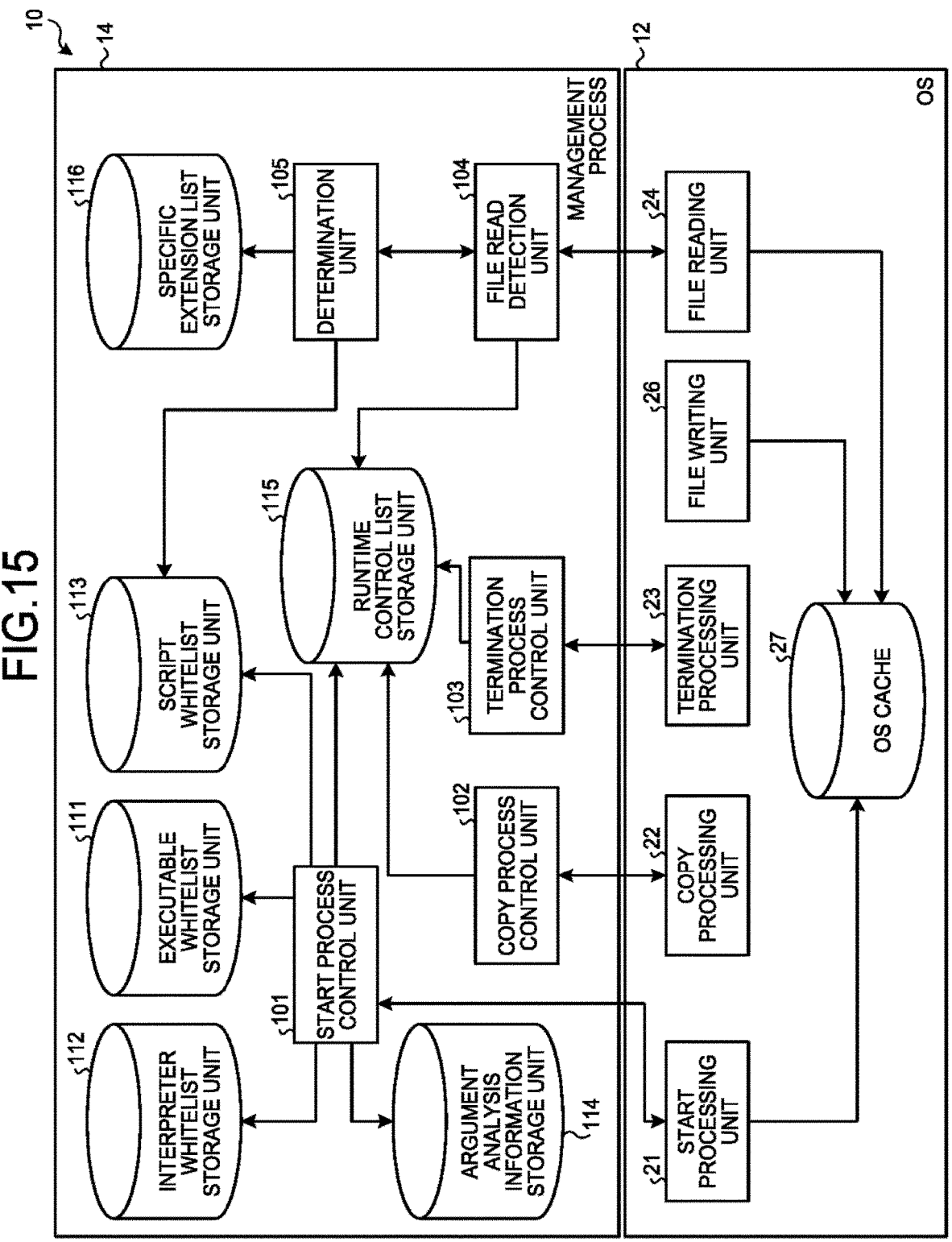
FIG. 15 is a block diagram illustrating a functional configuration of the information processing apparatus according to a modification.

FIG. 15 is a block diagram illustrating a functional configuration example of the information processing apparatus 10 according to the present modification. When compared with the configuration example of the first embodiment illustrated in FIG. 2, a file writing unit 26 performing writing on a file and an OS cache 27 holding the result of matching with the whitelist are added to the OS 12. The OS cache 27 holds the hash key calculated based on the file path name, the result of matching of the file specified by the file path name with the whitelist, and, if the file is a script file, the interpreter identification information identifying the interpreter that executes the script file, in association with each other as cache information, in the same manner as the management process cache 117 above.

Figure 16:
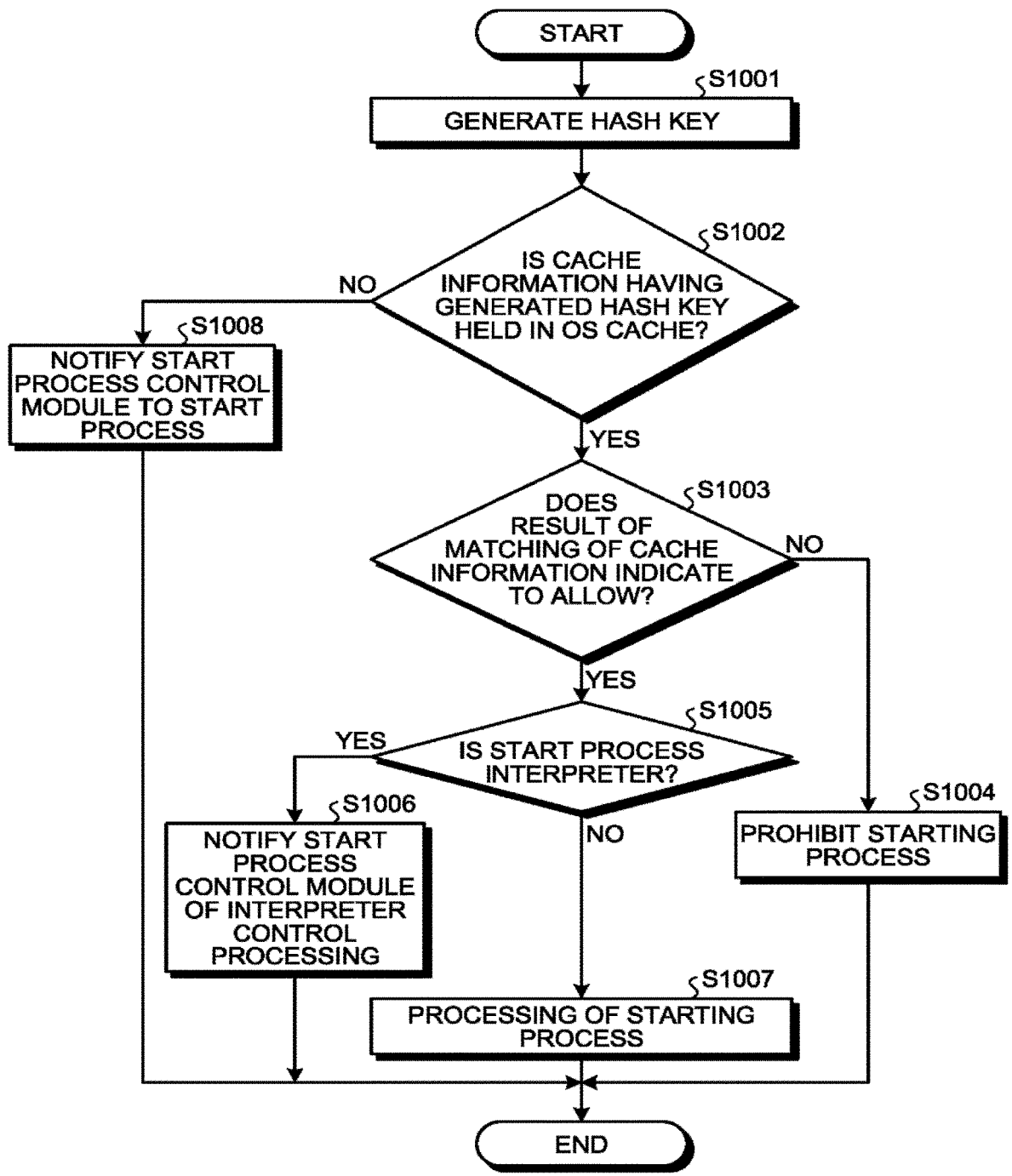
FIG. 16 is a flowchart illustrating an example of the procedure on the OS side during process starting.

FIG. 16 is a flowchart illustrating an example of the procedure on the OS 12 side during process starting in the present modification and illustrates an example of the procedure executed by the start processing unit 21 of the OS 12 when starting a process 13 is requested.

When starting a process 13 is requested, the start processing unit 21 of the OS 12 generates a hash key, first, based on the file path name of the start process (step S1001) and confirms whether cache information having the generated hash key is held in the OS cache 27 (step S1002). Then, if cache information having the hash key generated at step S1001 is held in the OS cache 27 (Yes at step S1002), the start processing unit 21 confirms whether the previous matching result included in the cache information indicates to allow (step S1003). Then, if the previous matching result indicates to prohibit (No at step S1003), the start processing unit 21 prohibits starting the process 13 requested and performs predetermined error processing (step S1004).

On the other hand, if the previous matching result included in the cache information indicates to allow (Yes at step S1003), then the start processing unit 21 determines whether the start process is an interpreter by confirming whether the cache information includes interpreter identification information (step S1005). Then, if the start process is an interpreter (Yes at step S1005), the start process control unit 101 of the management process 14 is notified of interpreter control processing for determination of starting of a script file to be executed by the interpreter (step S1006). On the other hand, if the start process is not an interpreter (No at step S1005), the start processing unit 21 performs the processing of starting a process 13 (step S1007).

If a notice of interpreter control processing is given to the start process control unit 101, the start processing unit 21 performs the processing of starting a process 13 in accordance with the notice of the determination result given by the start process control unit 101. That is, if a notice of the determination result to allow starting is given from the start process control unit 101, the start processing unit 21 performs the processing of starting the process 13 requested to be started. If a notice of the determination result to prohibit starting is given from the start process control unit 101, the start processing unit 21 prohibits starting the process 13 requested to be started and performs predetermined error processing.

If cache information having the hash key generated at step S1001 is not held in the OS cache 27 (No at step S1002), the start processing unit 21 notifies the start process control unit 101 of the management process 14 to start a process 13 (step S1008). In this case, the start processing unit 21 performs the processing of starting a process 13 and recording of cache information into the OS cache 27 in accordance with a notice of the determination result given from the start process control unit 101. That is, if a notice of the determination result to allow starting is given from the start process control unit 101, the start processing unit 21 records the hash key generated at step S1001, the matching result indicating to allow, and, if the start process is an interpreter, the interpreter identification information received from the management process 14, in association with each other as cache information into the OS cache 27, and performs the processing of starting the process 13 requested to be started. On the other hand, if a notice of the determination result to prohibit starting is given from the start process control unit 101, the start processing unit 21 records the hash key generated at step S1001, the matching result indicating to prohibit, and, if the start process is an interpreter, the interpreter identification information received from the management process 14, in association with each other as cache information into the OS cache 27, prohibits starting the process 13 requested to be started, and performs predetermined error processing.

Figure 17:
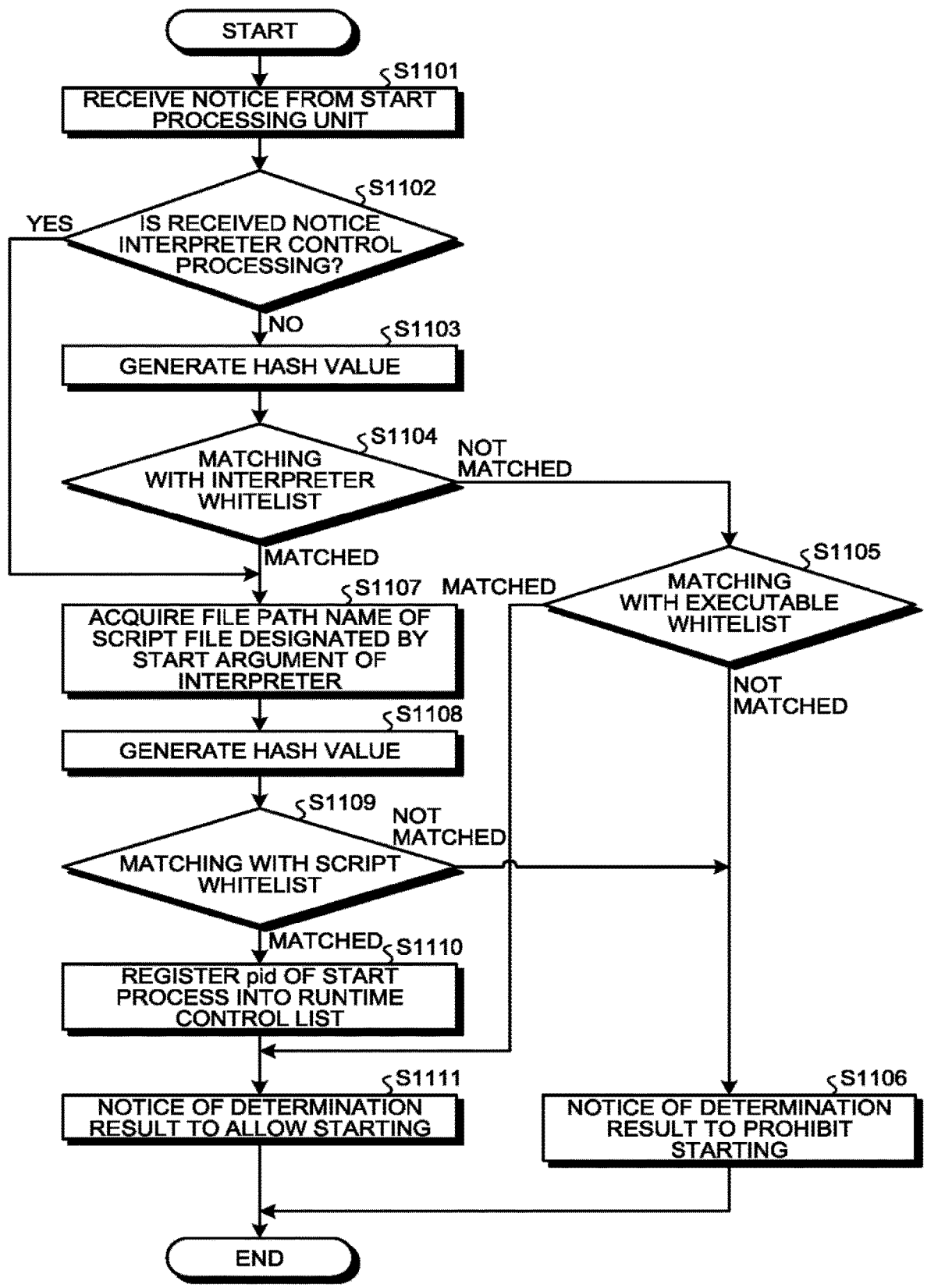
FIG. 17 is a flowchart illustrating an example of the procedure on the management process side during process starting.

FIG. 17 is a flowchart illustrating an example of the procedure on the management process 14 side during process starting in the present modification and illustrates an example of the procedure executed by the start processing unit 21 of the OS 12 when a notice of interpreter control processing or to start a process 13 is given from the start processing unit 21 of the OS 12. The processing from step S1103 to step S1111 in FIG. 17 is similar to the processing from step S102 to step S110 in FIG. 3, and a detailed description of these steps is omitted where appropriate.

When a notice of interpreter control processing or to start a process 13 is given from the start processing unit 21 of the OS 12, the start process control unit 101 of the management process 14 receives this notice (step S1101). Then, if the received notice is a notice of interpreter control processing (Yes at step S1102), the processing proceeds to step S1107, and subsequently, matching with the script whitelist and notification of the determination result to the start processing unit 21 are performed in the same manner as in the first embodiment. In order to accelerate matching with the script whitelist, a cache (part of the management process cache 117) for holding the result of matching with the script whitelist may be provided on the management process 14 side.

On the other hand, if the notice received from the start processing unit 21 is a notice to start a process 13 (No at step S1102), the processing proceeds to step S1103. Subsequently, matching with the interpreter whitelist and the executable whitelist, and, in addition, if there is a match in the interpreter whitelist, matching with the script whitelist are performed, and a notice of the determination result in accordance with the matching result is given to the start processing unit 21, in the same manner as in the first embodiment. If the result of matching with the script whitelist indicates to allow, the pid of the start process is registered into the runtime control list.

Figure 18:
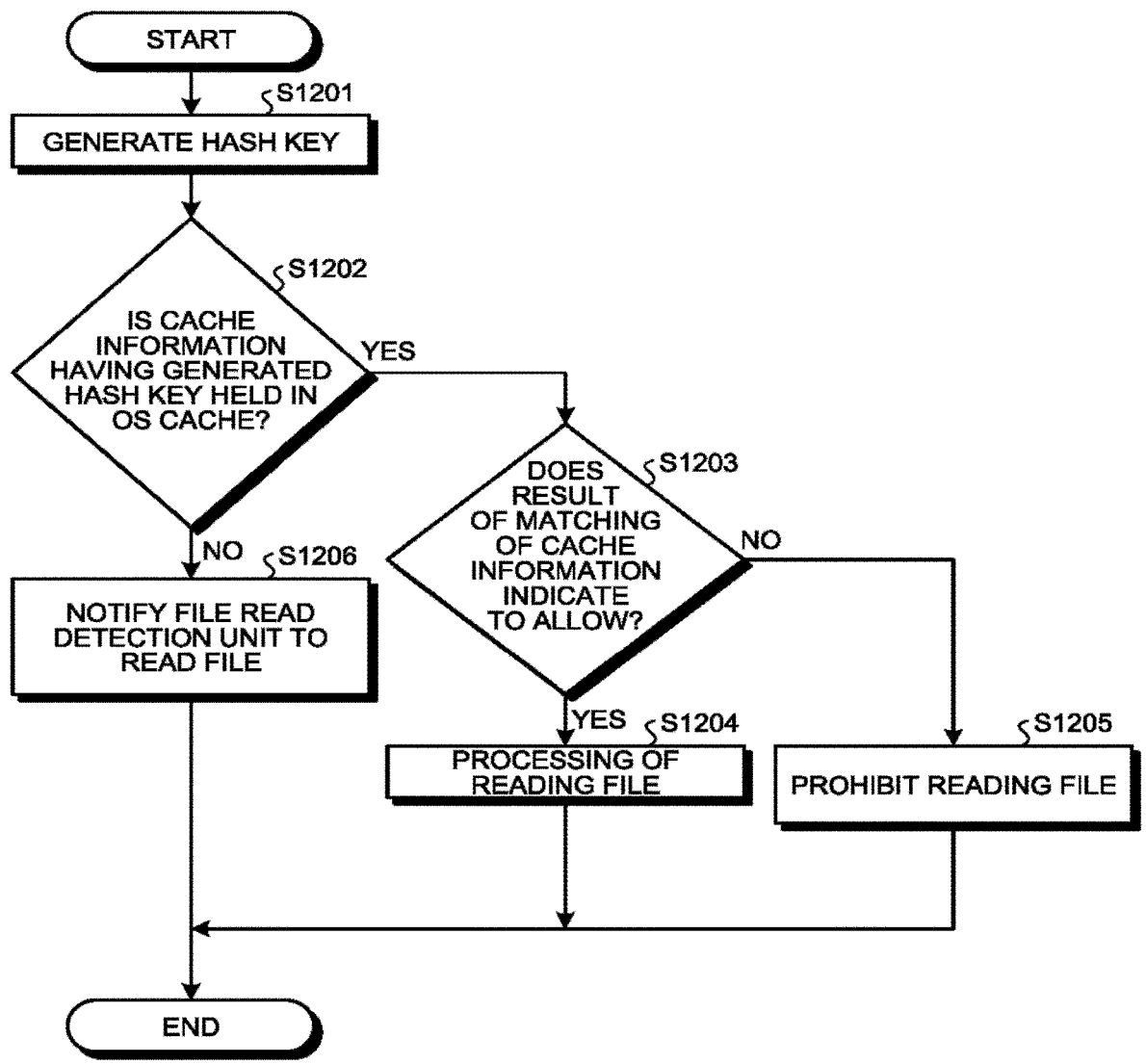
FIG. 18 is a flowchart illustrating an example of the procedure on the OS side during file reading.

FIG. 18 is a flowchart illustrating an example of the procedure on the OS 12 side during file reading in the present modification and illustrates an example of the procedure executed by the file reading unit 24 of the OS 12 when reading a file is requested by a process 13.

When reading a file is requested by a process 13, first, the file reading unit 24 of the OS 12 generates a hash key based on the file path name of the file requested to be read (step S1201) and confirms whether cache information having the generated hash key is held in the OS cache 27 (step S1202). Then, if cache information having the hash key generated at step S1201 is held in the OS cache 27 (Yes at step S1202), the file reading unit 24 confirms whether the previous matching result included in the cache information indicates to allow (step S1203). Then, if the previous matching result indicates to allow (Yes at step S1203), the file reading unit 24 performs the processing of reading the file requested to be read (step S1204). If the previous matching result indicates to prohibit (No at step S1203), the file reading unit 24 prohibits reading the file requested to be read (step S1205).

If cache information having the hash key generated at step S1201 is not held in the OS cache 27 (No at step S1202), the file reading unit 24 notifies the file read detection unit 104 of the management process 14 to read a file (step S1206). In this case, when a notice to allow reading a file is given from the file read detection unit 104, the file reading unit 24 performs the processing of reading the file requested to be read. When a notice of the determination result of the determination unit 105 is given from the file read detection unit 104, the processing of reading a file and recording of cache information into the OS cache 27 are performed in accordance with the given determination result. That is, if the determination result of the determination unit 105 indicates to allow reading a file, the file reading unit 24 records the hash key generated at step S1201, the matching result to allow, and the interpreter identification information received from the management process 14 in association with each other as cache information into the OS cache 27 and performs the processing of reading the file requested to be read. On the other hand, if the determination result of the determination unit 105 indicates to prohibit reading a file, the file reading unit 24 records the hash key generated at step S1201, the matching result to prohibit, and the interpreter identification information received from the management process 14 in association with each other as cache information into the OS cache 27 and prohibits reading the file requested to be read.

Figure 19:
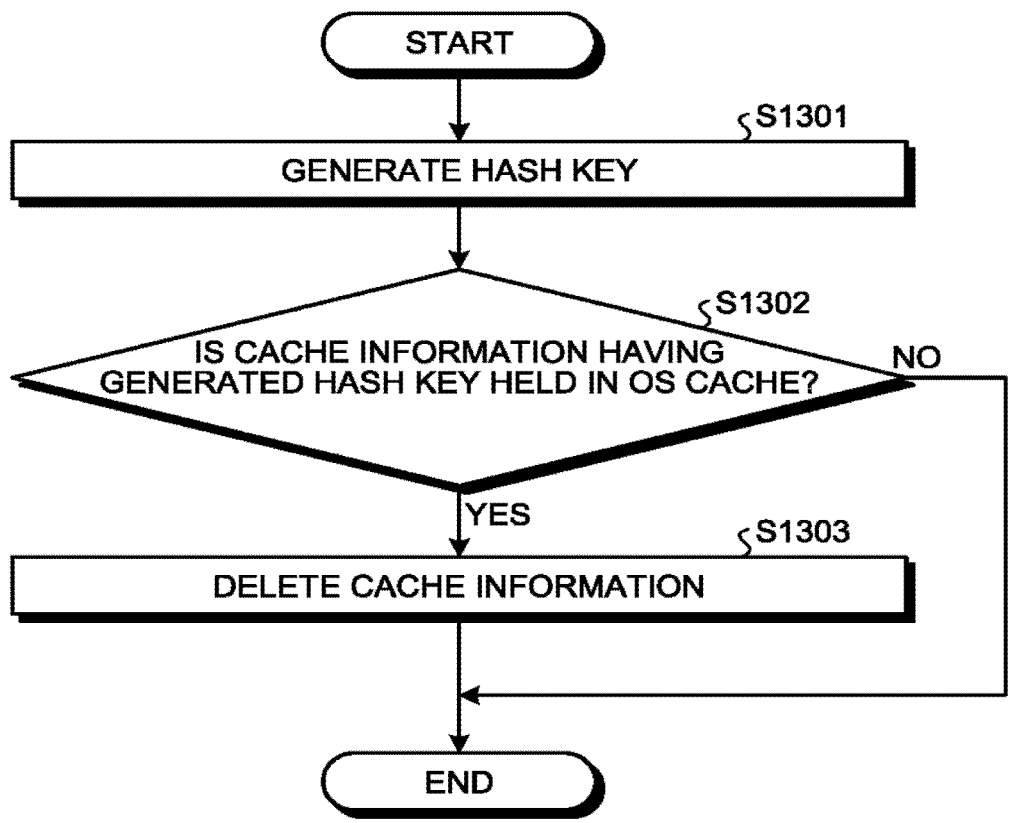
FIG. 19 is a flowchart illustrating an example of the procedure on the OS side during file writing.

FIG. 19 is a flowchart illustrating an example of the procedure on the OS 12 side during file writing in the present modification and illustrates an example of the procedure executed by the file writing unit 26 of the OS 12 when writing on a file is requested by a process 13.

When writing on a file is requested by a process 13, first, the file writing unit 26 of the OS 12 generates a hash key based on the file path name of the file requested to be written (step S1301) and confirms whether cache information having the generated hash key is held in the OS cache 27 (step S1302). Then, if cache information having the hash key generated at step S1301 is held in the OS cache 27 (Yes at step S1302), the file writing unit 26 deletes the cache information from the OS cache 27 (step S1303) and performs writing processing on the requested file. On the other hand, if cache information having the hash key generated at step S1301 is not held in the OS cache 27 (No at step S1302), the file writing unit 26 proceeds to perform writing processing on the requested file.

As described above, in the present modification, the OS cache 27 is provided on the OS 12 side, and if the same file is repeatedly accessed, the OS cache 27 is referenced to perform execution control in accordance with the previous matching result. This configuration can eliminate the repetition of matching processing and reduce the processing load in the same manner as in the case where the management process cache 117 is provided on the management process 14 side.

The functions of the OS 12 and the management process 14 in the information processing apparatus 10 in the foregoing embodiments can be implemented, for example, as a computer program such as software to be executed by a processor mounted as the hardware 11 on the information processing apparatus 10. In this case, the information processing apparatus 10 in the foregoing embodiments may be loaded with the computer program in advance to implement the functions of the OS 12 and/or the management process 14 or may be loaded as appropriate with the computer program recorded in a recording medium or distributed over a network to implement the functions of the OS 12 and/or the management process 14.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
processing circuitry configured to function as:
a start process control unit configured to register at least a specific process of started processes in an identifiable manner into a first list;
a file read detection unit configured to detect a request to read a file by the specific process registered in the first list;
a determination unit configured to determine whether to allow reading of the requested file based on a first condition; and
a file reading unit configured to control reading of the file in accordance with a determination result of the determination unit, and
a cache configured to hold cache information including the determination result based on the first condition, wherein
the processing circuitry is further configured to function as a file write control unit configured to, when cache information relating to a file to be written is included in the cache, delete the cache information from the cache, and
when cache information relating to the file requested to be read is included in the cache, the determination unit determines whether to allow reading of the file in accordance with a determination result of the cache information.

2. The apparatus according to claim 1, wherein
when the file is not provided with a specific extension, the determination unit allows reading of the file, and
when the file is provided with the specific extension, the determination unit determines whether to allow reading of the file based on the first condition.

3. The apparatus according to claim 1, wherein the processing circuitry is further configured to function as a copy process control unit configured to, during copying of a process, when a parent process is a specific process registered in the first list, register a child process as a specific process into the first list.

4. The apparatus according to claim 1, wherein the processing circuitry is further configured to function as a termination process control unit configured to, during termination of a process, when a process to be terminated is a specific process registered in the first list, delete the specific process from the first list.

5. The apparatus according to claim 1, wherein
when a process to be started is a specific process, the start process control unit determines whether to allow starting of the specific process based on a second condition, and
the processing circuitry is further configured to function as a start processing unit configured to control starting of the specific process in accordance with a determination result of the start process control unit.

6. The apparatus according to claim 5, wherein
the specific process is a process of an interpreter, and
when it is determined to allow starting of the specific process, the start process control unit registers the specific process allowed to be started into the first list in association with identification information of the interpreter.

7. The apparatus according to claim 6, further comprising a script whitelist storage unit configured to store a script whitelist in which a list of executable script files is associated with identification information of interpreters executing the script files, wherein
the first condition is a condition that a combination of the file requested to be read and the identification information of the interpreter registered in the first list in association with the specific process requesting to read is included in the script whitelist, and
the determination unit permits reading of the file in case of matching the first condition, and denies reading of file in case of no matching the first condition.

8. The apparatus according to claim 7, further comprising an argument analysis information storage unit configured to store argument analysis information in association with identification information of an interpreter, wherein
the start process control unit specifies a script file to be executed by the interpreter during starting based on the argument analysis information stored in the argument analysis information storage unit in association with the identification information of the interpreter that is a specific process to be started,
the second condition is a condition that a combination of a script file to be executed by the interpreter during starting and the identification information of the interpreter is included in the script whitelist, and
the start process control unit permits starting of the specific process in case of matching the second condition, and denies starting of the specific process in case of no matching the second condition.

9. The information processing apparatus according to claim 8, wherein
the cache is configured to hold cache information including a determination result based on the second condition, and
when cache information relating to a script file to be executed by the interpreter during starting is included in the cache, the start process control unit controls starting of the interpreter in accordance with a determination result of the cache information.

10. The apparatus according to claim 5, wherein
when a process to be started is a process other than a specific process, the start process control unit determines whether to allow starting of the process based on a third condition, and
the start processing unit controls starting of a process other than a specific process in accordance with a determination result of the start process control unit.

11. An information processing method comprising:
registering at least a specific process of started processes in an identifiable manner into a first list;
detecting a request to read a file by a specific process registered in the first list;
determining whether to allow reading of the requested file based on a first condition;
controlling reading of the file in accordance with a determination result;
when cache information relating to a file to be written is included in a cache, deleting the cache information from the cache, the cache being configured to hold cache information including the determination result based on the first condition; and
when cache information relating to the file requested to be read is included in the cache, determining whether to allow reading of the file in accordance with a determination result of the cache information.

12. A computer program product having a non-transitory computer readable medium including programmed instructions, wherein the instructions, when executed by a computer, cause the computer to perform:
- a function of registering at least a specific process of started processes in an identifiable manner into a first list;
- a function of detecting a request to read a file by a specific process registered in the first list;
- a function of determining whether to allow reading of the requested file based on a first condition;
- a function of controlling reading of the file in accordance with a determination result;
- when cache information relating to a file to be written is included in a cache, a function of deleting the cache information from the cache, the cache being configured to hold cache information including the determination result based on the first condition; and
- when cache information relating to the file requested to be read is included in the cache, a function of determining whether to allow reading of the file in accordance with a determination result of the cache information.

* * * * *